(12) United States Patent
Hull

(10) Patent No.: US 11,472,138 B2
(45) Date of Patent: Oct. 18, 2022

(54) METHODS AND SYSTEMS FOR IDENTIFYING PROCESSING LOCATIONS IN COMPOSITE LAYUPS

(71) Applicant: The Boeing Company, Chicago, IL (US)

(72) Inventor: Jerald A. Hull, North Charleston, SC (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 17/329,213

(22) Filed: May 25, 2021

(65) Prior Publication Data

US 2021/0276287 A1  Sep. 9, 2021

Related U.S. Application Data

(62) Division of application No. 16/653,612, filed on Oct. 15, 2019, now Pat. No. 11,046,033.

(51) Int. Cl.
| | | |
|---|---|---|
| *B29C 70/54* | (2006.01) | |
| *B29C 70/30* | (2006.01) | |
| *B29C 70/74* | (2006.01) | |
| *B29C 33/16* | (2006.01) | |
| *B29C 70/76* | (2006.01) | |
| *B29C 65/78* | (2006.01) | |
| *B65G 1/07* | (2006.01) | |

(Continued)

(52) U.S. Cl.
CPC ............ *B29C 70/541* (2013.01); *B29C 33/16* (2013.01); *B29C 65/785* (2013.01); *B29C 70/30* (2013.01); *B29C 70/74* (2013.01); *B29C 70/742* (2013.01); *B29C 70/766* (2013.01); *B65G 1/07* (2013.01); *B65G 54/02* (2013.01); *B29L 2031/3076* (2013.01)

(58) Field of Classification Search
USPC .................... 81/57.37, 430, 435; 221/212
See application file for complete search history.

(56) References Cited

U.S. PATENT DOCUMENTS

| | | |
|---|---|---|
| 9,789,462 B2 | 10/2017 | Singh |
| 11,046,033 B2 | 6/2021 | Hall |
| 2021/0107240 A1 | 4/2021 | Hull |

OTHER PUBLICATIONS

U.S. Appl. No. 16/653,612, Examiner Interview Summary dated Mar. 25, 21, 1 pg.

(Continued)

*Primary Examiner* — Barbara J Musser
(74) *Attorney, Agent, or Firm* — Kwan & Olynick LLP

(57) ABSTRACT

Described are methods and systems for identifying processing locations in composite layups. An optical magnetic marker is magnetically supported by a layup tool at a target position, such that a portion of the marker protrudes above the tool processing surface. When a composite layup is placed onto that surface, the protruding portion extends into the layup at a processing location. When the layup is cured, the marker is permanently embedded into the layup. Separating the cured layup from the tool removes the marker from the tool and allows an additional marker to advance into the target position for processing another layup. The embedded marker or, more specifically, marker's reflective surface is used during optical inspection of the layup surface to precisely determine the processing location. In some examples, the marker is consumed while the layup is processed at that location,

20 Claims, 20 Drawing Sheets

(51) Int. Cl.
*B65G 54/02* (2006.01)
*B29L 31/30* (2006.01)

(56) References Cited

OTHER PUBLICATIONS

U.S. Appl. No. 16/653,612, Notice of Allowance dated Mar. 25, 21, 8 pgs.
U.S. Appl. No. 16/653,612, Restriction Requirement dated Jan. 29, 21, 5 pgs.

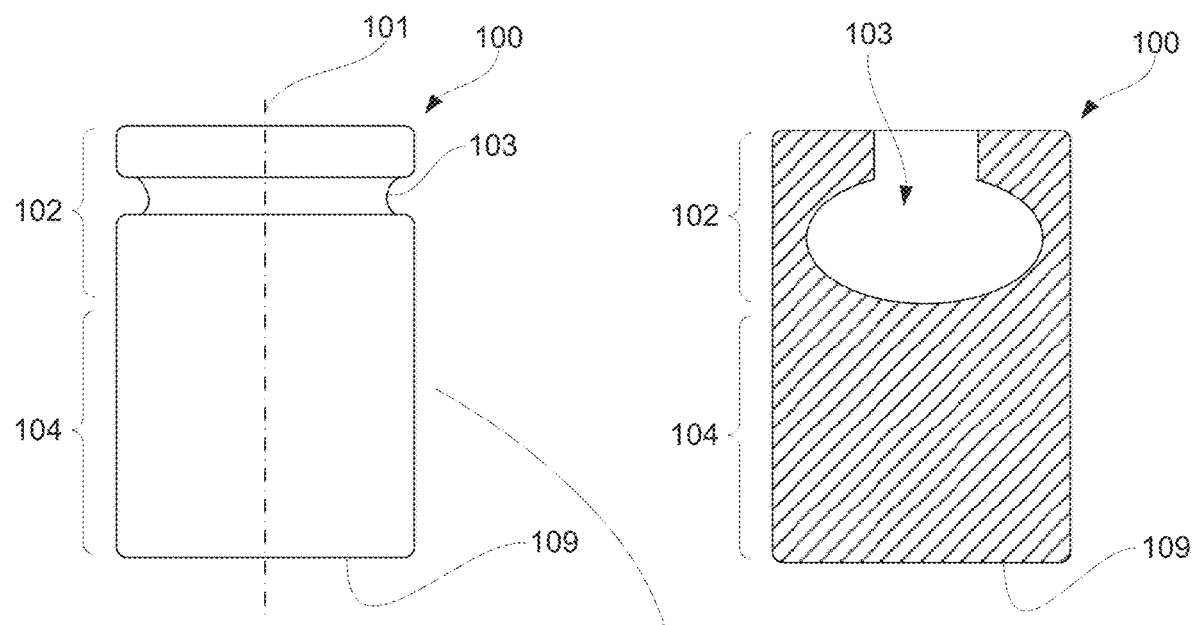
FIG. 1A
FIG. 1B
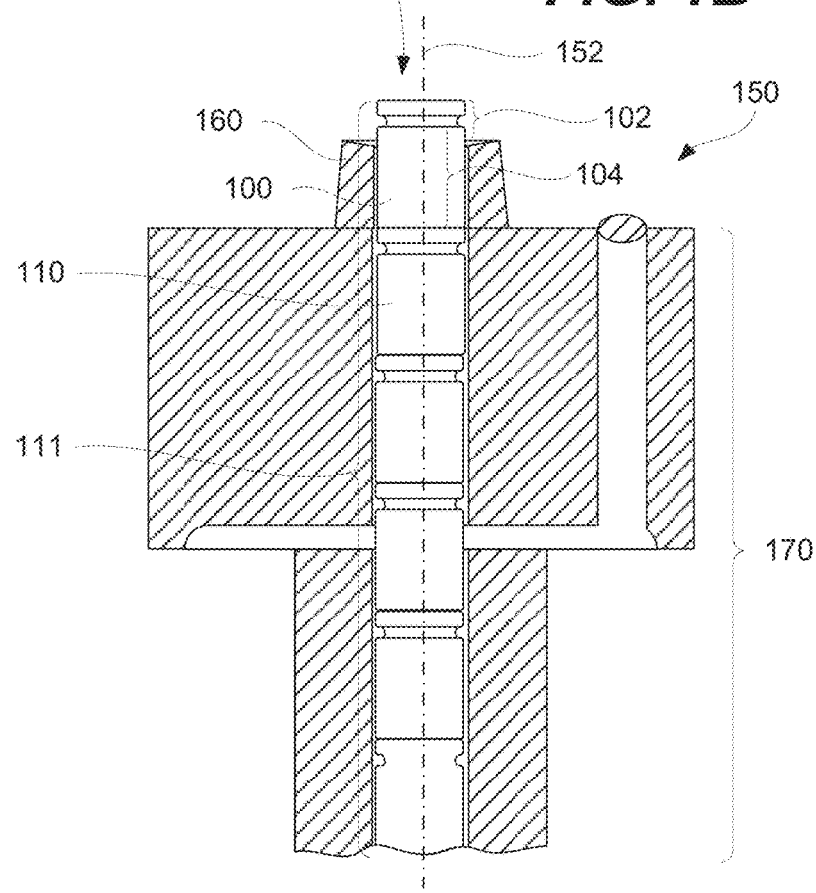
FIG. 1C

FIG. 3C  FIG. 3D

METHODS AND SYSTEMS FOR IDENTIFYING PROCESSING LOCATIONS IN COMPOSITE LAYUPS

CROSS-REFERENCE TO RELATED APPLICATIONS

This application is a divisional of U.S. Non-Provisional patent application Ser. No. 16/653,612, filed on 2019 Oct. 15, now U.S. Pat. No. 11,046,033, which is incorporated herein by reference in its entirety for all purposes.

BACKGROUND

Accuracy of processing (e.g., machining, drilling) of composite layups largely depends on ability to precisely determine processing locations on the surface of these layups. Special locating fixtures are typically limited to small and/or rigid parts, while many layups (e.g., used in aircraft fabrication) are large and can be flexible. Furthermore, a composite layup may have complex surfaces with multiple processing locations scattered on these surfaces, which makes the process of precisely identifying all these location even more difficult.

At the same time, high accuracy is needed for various types of processing (e.g., robotics) and/or components (e.g., hole patterns on interchangeable components). For example, aircraft doors are often replaced at least once during the aircraft life. In this example, the mating characteristics of the door and the door frame require tight tolerances when forming hole patterns.

Furthermore, different aircraft components and replacement parts can be manufactured at different plants and at different times. For example, an aircraft manufacturer may outsource fabrication of replacement parts to a supplier. While some manufacturing inaccuracies in a process repeated in the same place and time may cancel each other out or aggregate within acceptable limits, a part made several years later and at a different location is less likely to have these benefits.

What is needed are new methods and systems for identifying processing locations in composite layups.

SUMMARY

Described are methods and systems for identifying processing locations in composite layups. An optical magnetic marker is magnetically supported by a layup tool at a target position, such that a portion of the marker protrudes above the tool processing surface. When a composite layup is placed onto that surface the protruding portion extends into the layup at a processing location. When the layup is cured, the marker is permanently embedded into the layup. Separating the cured layup from the tool removes the marker from the tool and allows an additional marker to advance into the target position for processing another layup. The embedded marker or, more specifically, marker's reflective surface is used during optical inspection of the layup surface to precisely determine the processing location. In some examples, the marker is consumed while the layup is processed at that location.

In some examples, a method for identifying a processing location in a composite layup comprises advancing an optical magnetic marker into a target position at a layup tool. The optical magnetic marker comprises a reflective surface and an anchor. The anchor protrudes away from the layup tool and is opposite to the reflective surface. The method further comprises placing a composite layup over the layup tool, while maintaining the optical magnetic marker at the target position, such that the anchor of the optical magnetic marker protrudes into and directly engages the composite layup. The method proceeds with curing the composite layup thereby bonding the anchor of the optical magnetic marker to the composite layup. After curing the composite layup, the method proceeds with separating the composite layup from the layup tool such that the optical magnetic marker is extracted from the layup tool while the optical magnetic marker is bonded to the composite layup. At this stage, the reflective surface of the optical magnetic marker is radially surrounded by a layup cavity. The layup cavity comprises a bottom surface and a side surface. The angle between the bottom surface and the reflective surface of the optical magnetic marker is greater than 0°.

In some examples, an optical magnetic marker dispenser comprises a magnetic retention ring, a magazine, and a marker supporting cavity. The magnetic retention ring comprises a first end and a second end, opposite to the first end along the dispenser center axis. The magnetic retention ring is magnetized and further comprises a leading surface and a side surface. The leading surface is positioned at the first end and forms the smallest angle with the dispenser center axis of less than 90°. The magazine is connected to the magnetic retention ring. The marker supporting cavity extends through the magazine and the magnetic retention ring and is open at the first end of the magnetic retention ring. The marker supporting cavity is configured to store a plurality of optical magnetic markers.

In some examples, a layup tool comprises a layup tool base and an optical magnetic marker dispenser. The layup tool base comprises a base processing surface and a base cavity. The optical magnetic marker dispenser has a dispenser center axis and comprises a magazine, a magnetic retention ring, and a marker supporting cavity. The magazine protrudes into the base cavity and is supported within the base cavity by the layup tool base. The magnetic retention ring is magnetized and is connected to the magazine. The magnetic retention ring comprises a leading surface, forming the smallest angle with the dispenser center axis of less than 90°. The magnetic retention ring also comprises a side surface. The marker supporting cavity extends through the magazine and the magnetic retention ring and is open at the leading surface of the magnetic retention ring.

FIG, 1F is a schematic cross-sectional view of a magnetic dispenser, in accordance with some examples.

Figure 2:
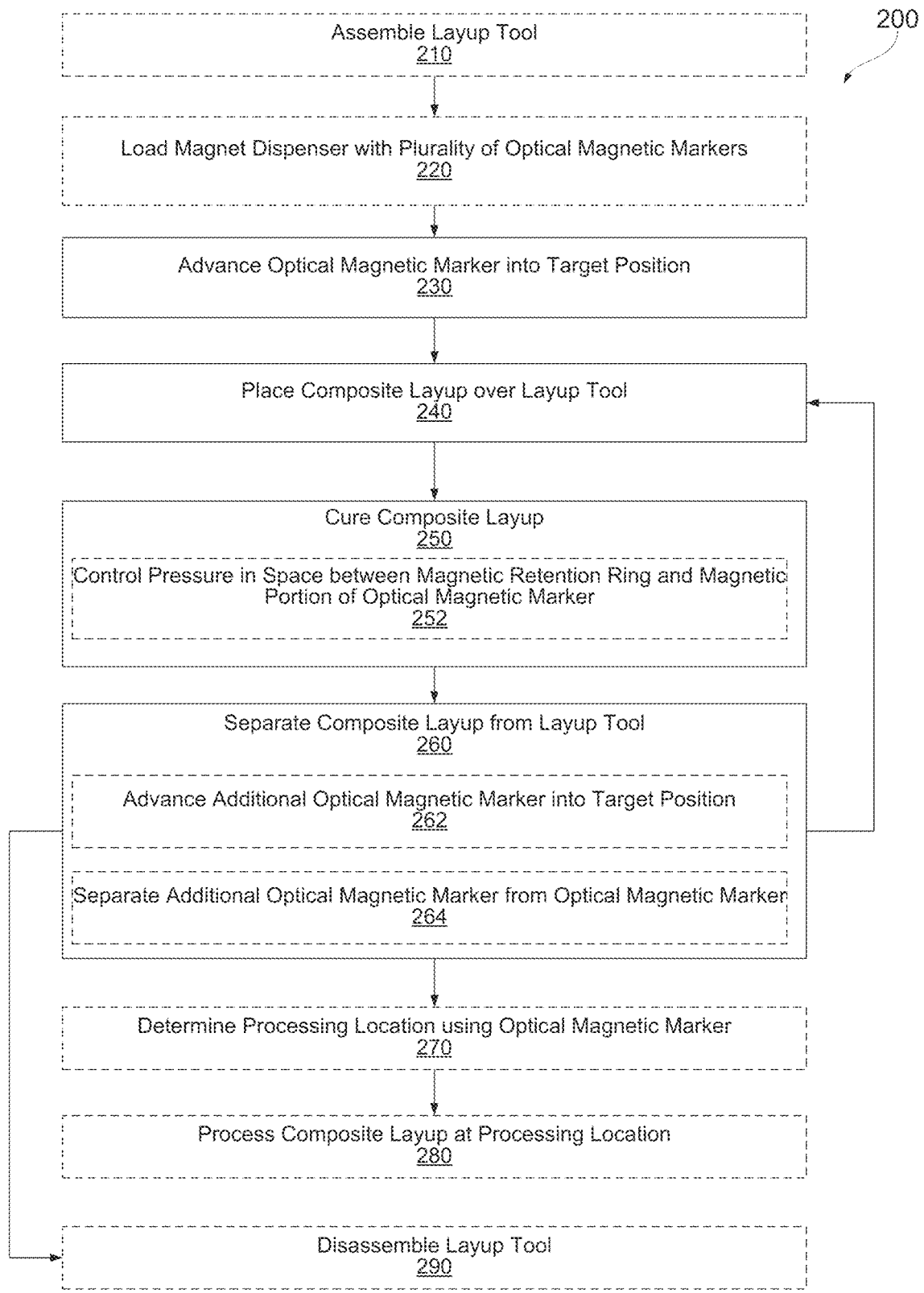

FIG. 2 is a process flowchart of a method for identifying a processing location in a composite layup, in accordance with some examples.

Figure 3A:
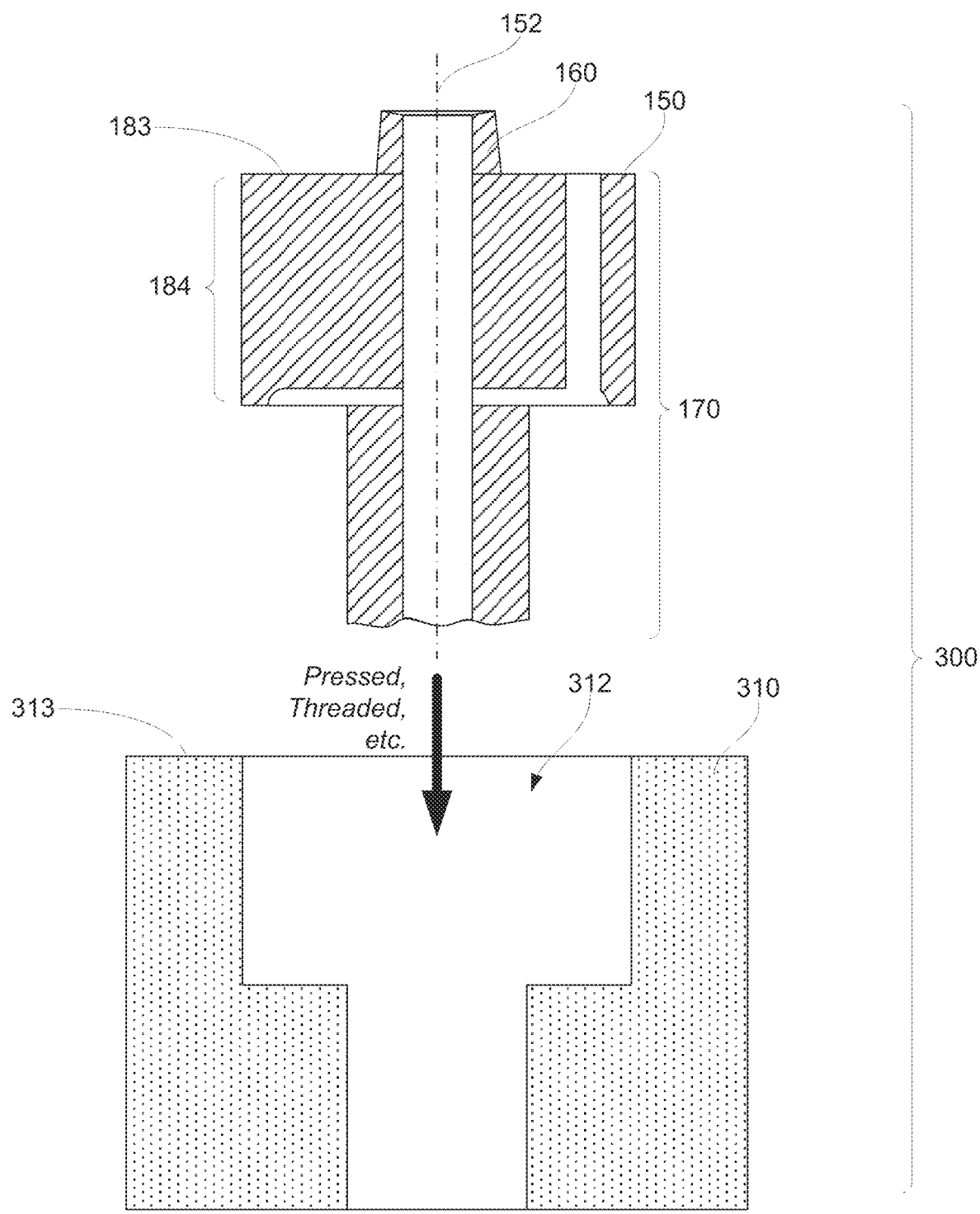

FIG. 3A is a schematic cross-sectional view of a layup tool during assembly and prior to attaching the magnetic dispenser to the layup tool base, in accordance with some examples.

Figure 3B:
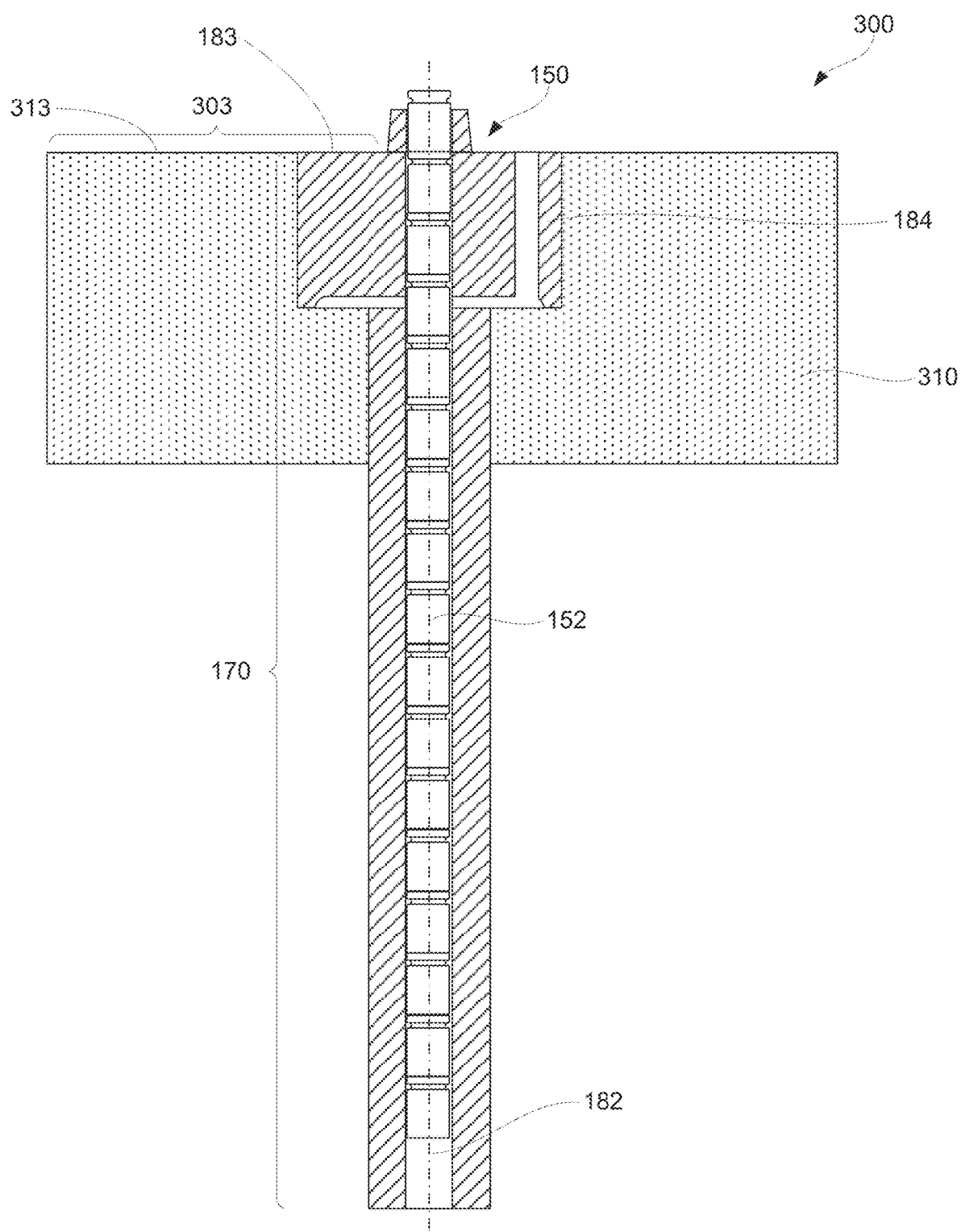

FIG. 3B is a schematic cross-sectional view of a layup tool, after the magnetic dispenser has been attached to the layup tool base, in accordance with some examples.

FIGS. 3C and 3D are schematic cross-sectional views of a layup tool, showing the optical magnetic marker advancing into the target position at the layup tool, in accordance with some examples.

Figure 3E:
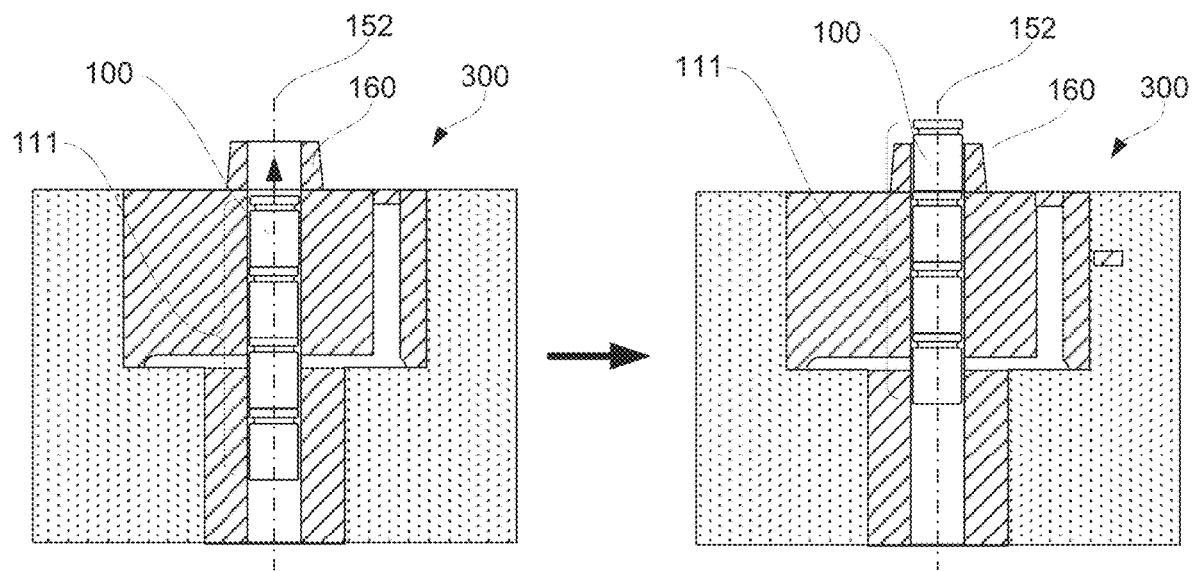
Figure 3E:
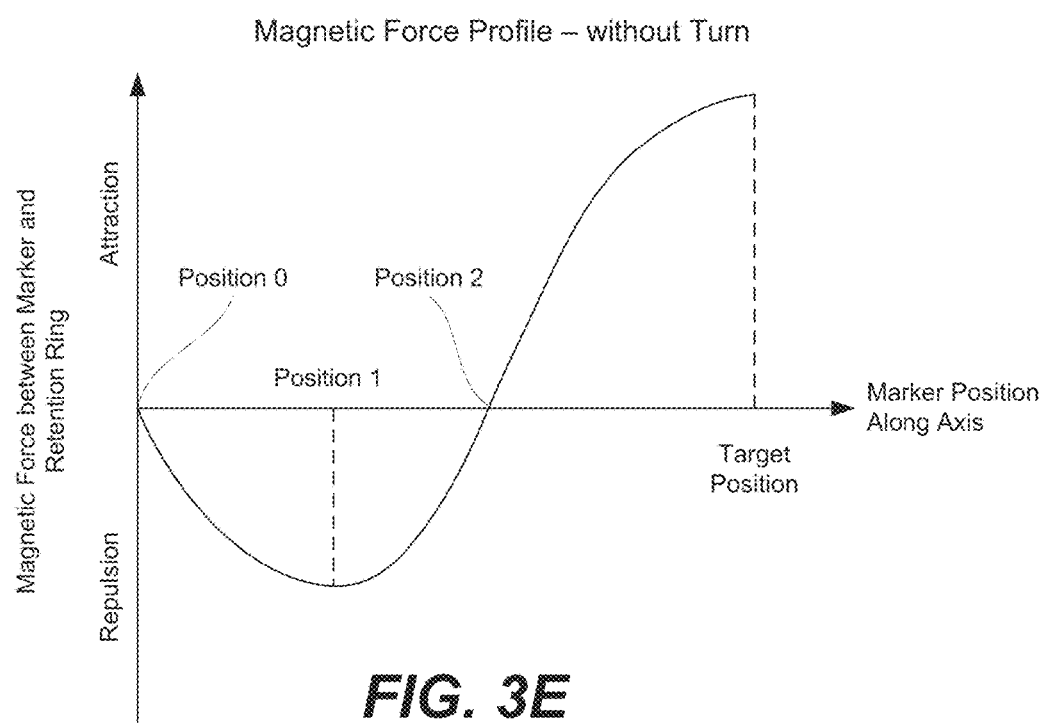

FIG. 3E is a plot of a magnetic force, acting on a optical magnetic marker, as a function of the marker position within a layup tool, in accordance with some examples.

Figures 3F, 3G:
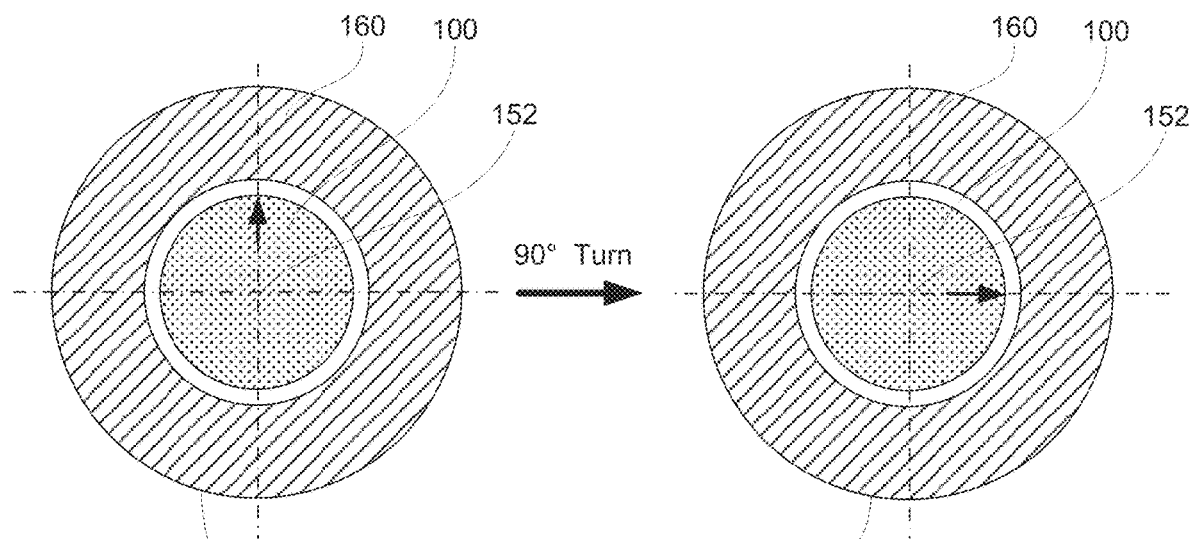

FIGS. 3F and 3G are top views of a layup tool, showing the optical magnetic marker being turned within the layup tool, in accordance with some examples.

Figure 3H:
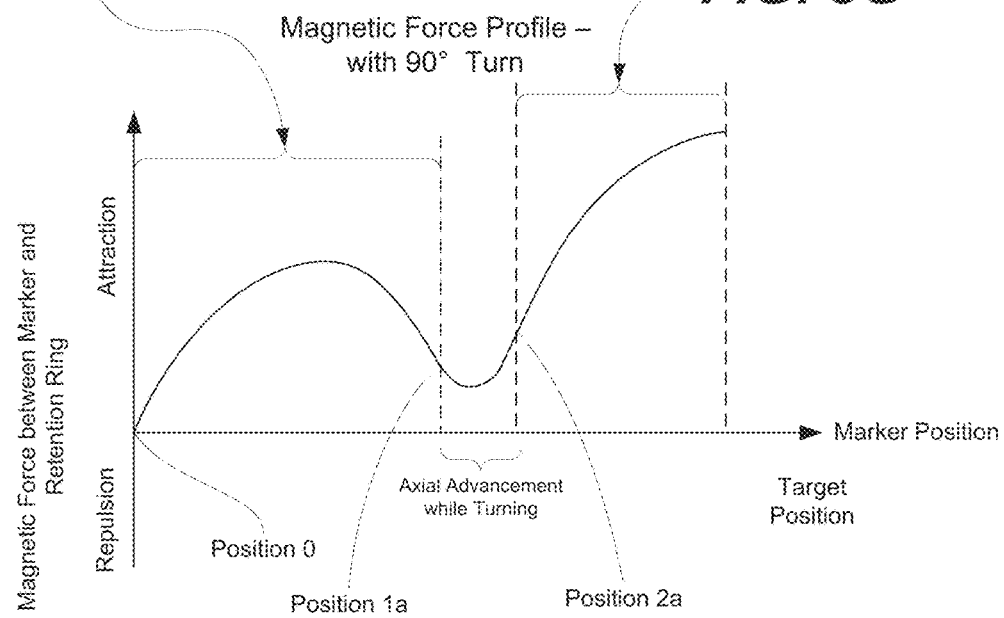

FIG. 3H is a plot of a magnetic force, acting on an optical magnetic marker, as a function of the marker position within the layup tool, when the marker and the magnetic retention ring are diametrically magnetized and when the marker is turned 90° relative to the magnetic retention ring while advancing to the target position, in accordance with some examples.

Figure 4A:
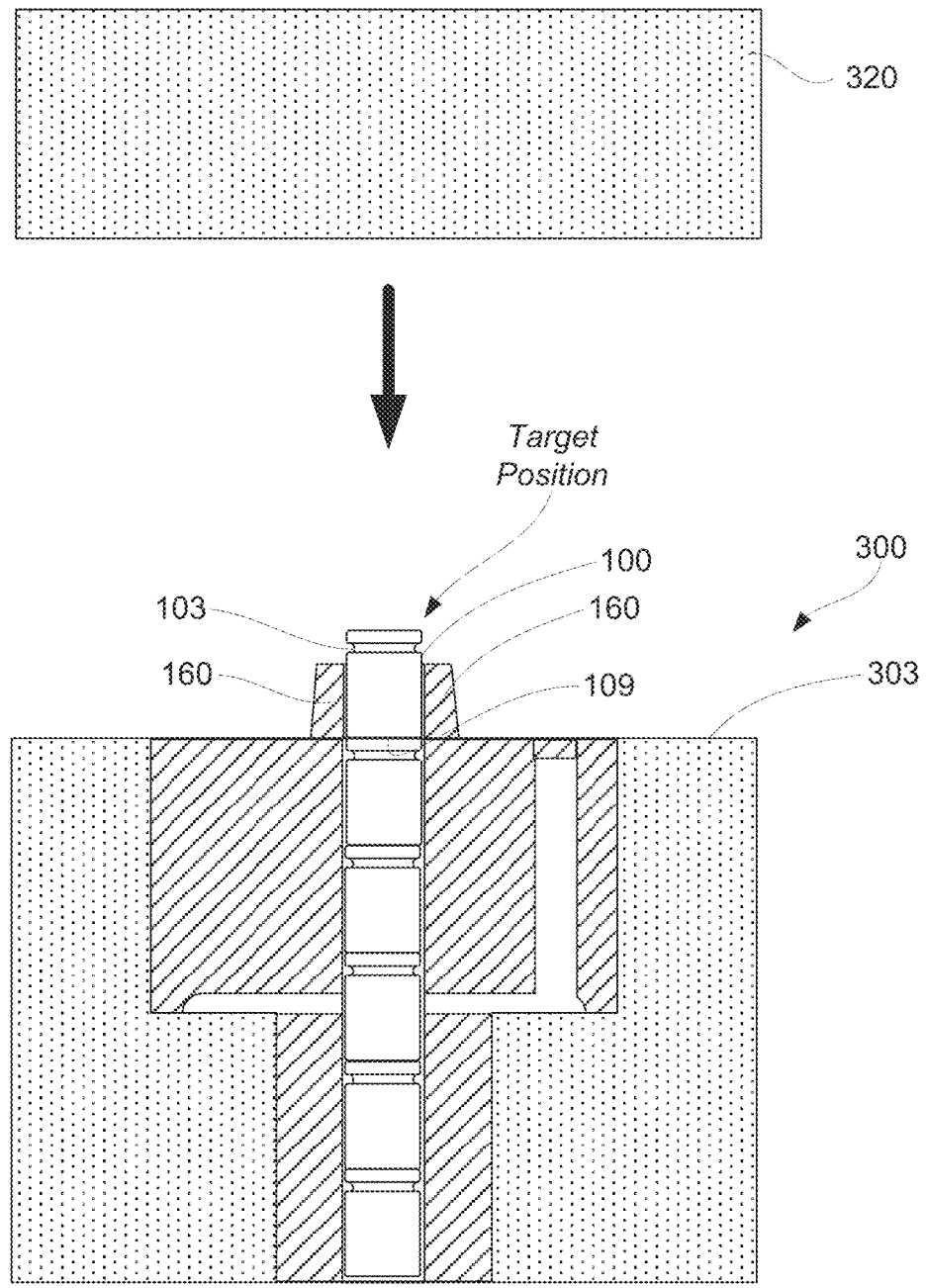

FIG. 4A is a schematic cross-sectional view of a layup tool prior to placing a composite layup over the layup tool, in accordance with some examples.

Figure 4B:
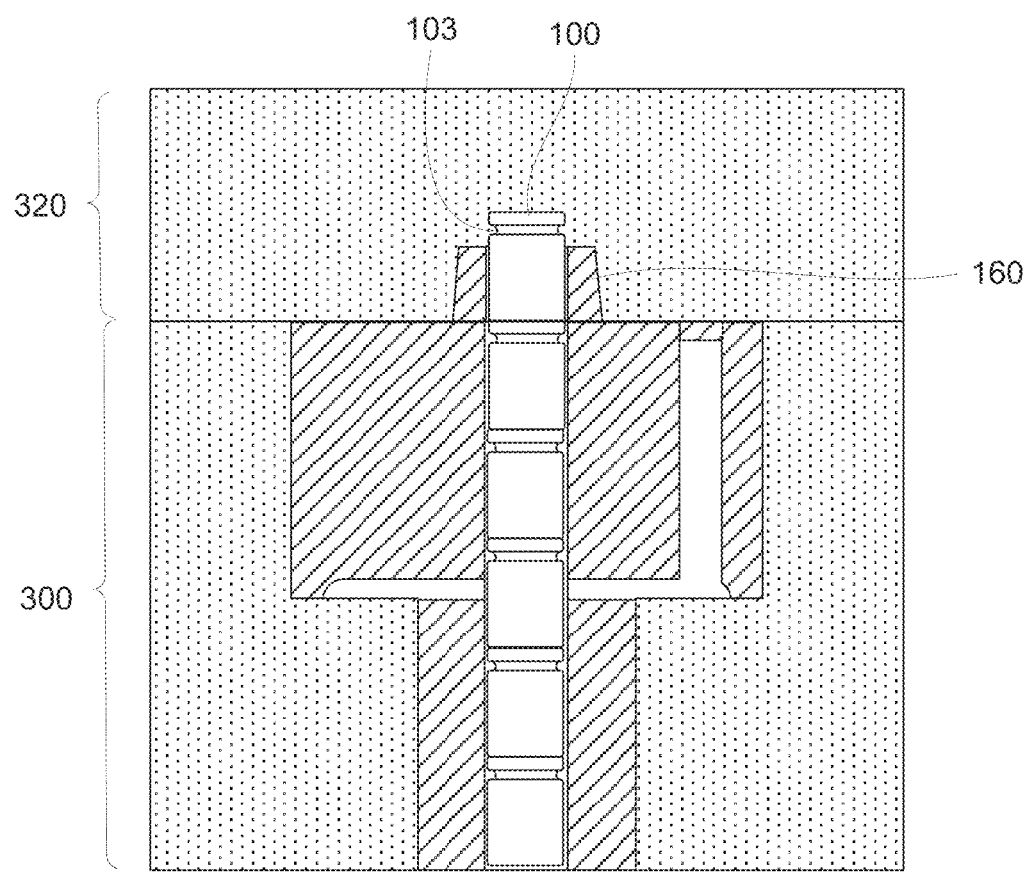

FIG. 4B is a schematic cross-sectional view of a layup tool after a composite layup has been placed onto the layup tool, in accordance with some examples.

Figure 4C:
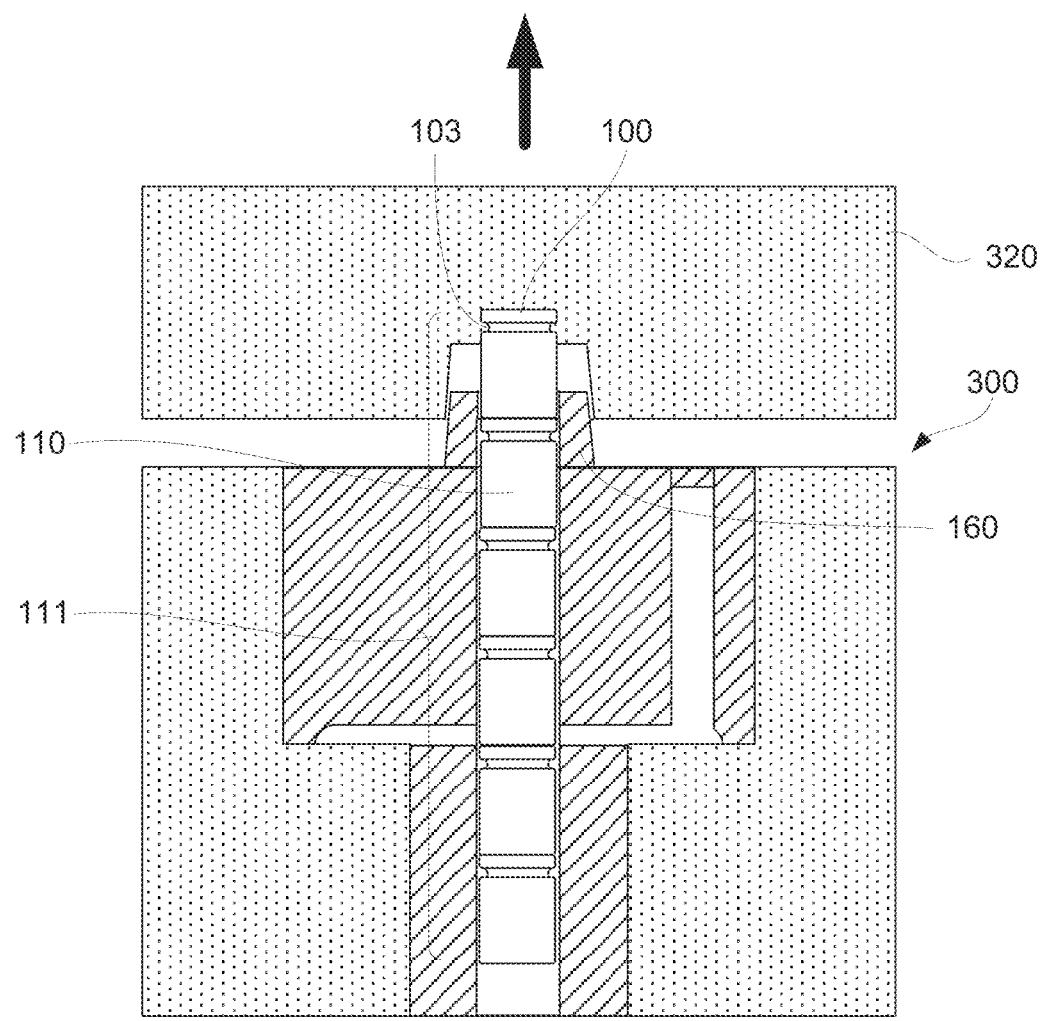

FIG. 4C is a schematic cross-sectional view of a layup tool and a composite layup while separating the composite layup from the layup tool, showing an optical magnetic marker embedded into the composite layup and being removed from the layup tool, in accordance with some examples.

Figure 4D:
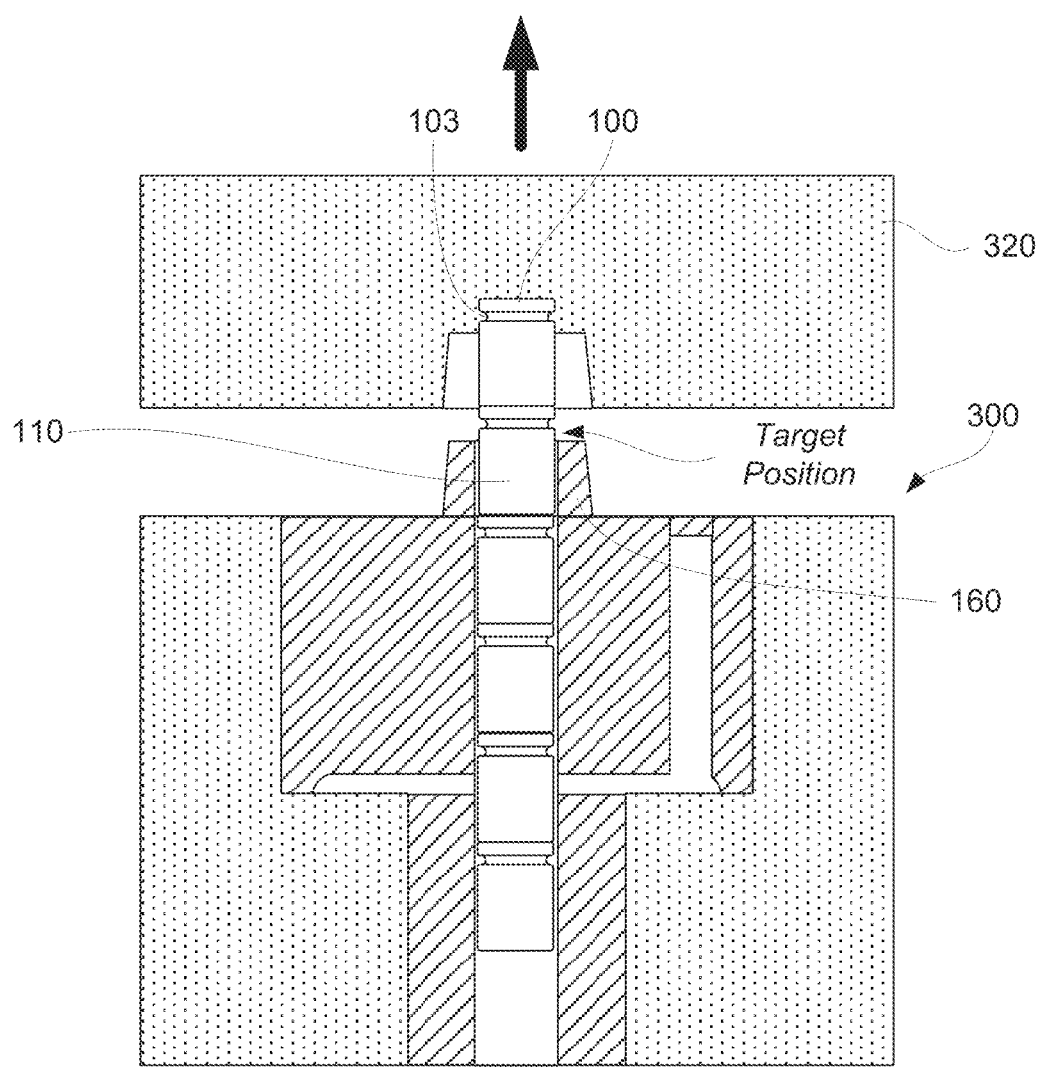

FIG. 4D is a schematic cross-sectional view of a layup tool and a composite layup while separating the composite layup from the layup tool, showing an additional optical magnetic marker advancing into the target position, in accordance with some examples.

Figure 4E:
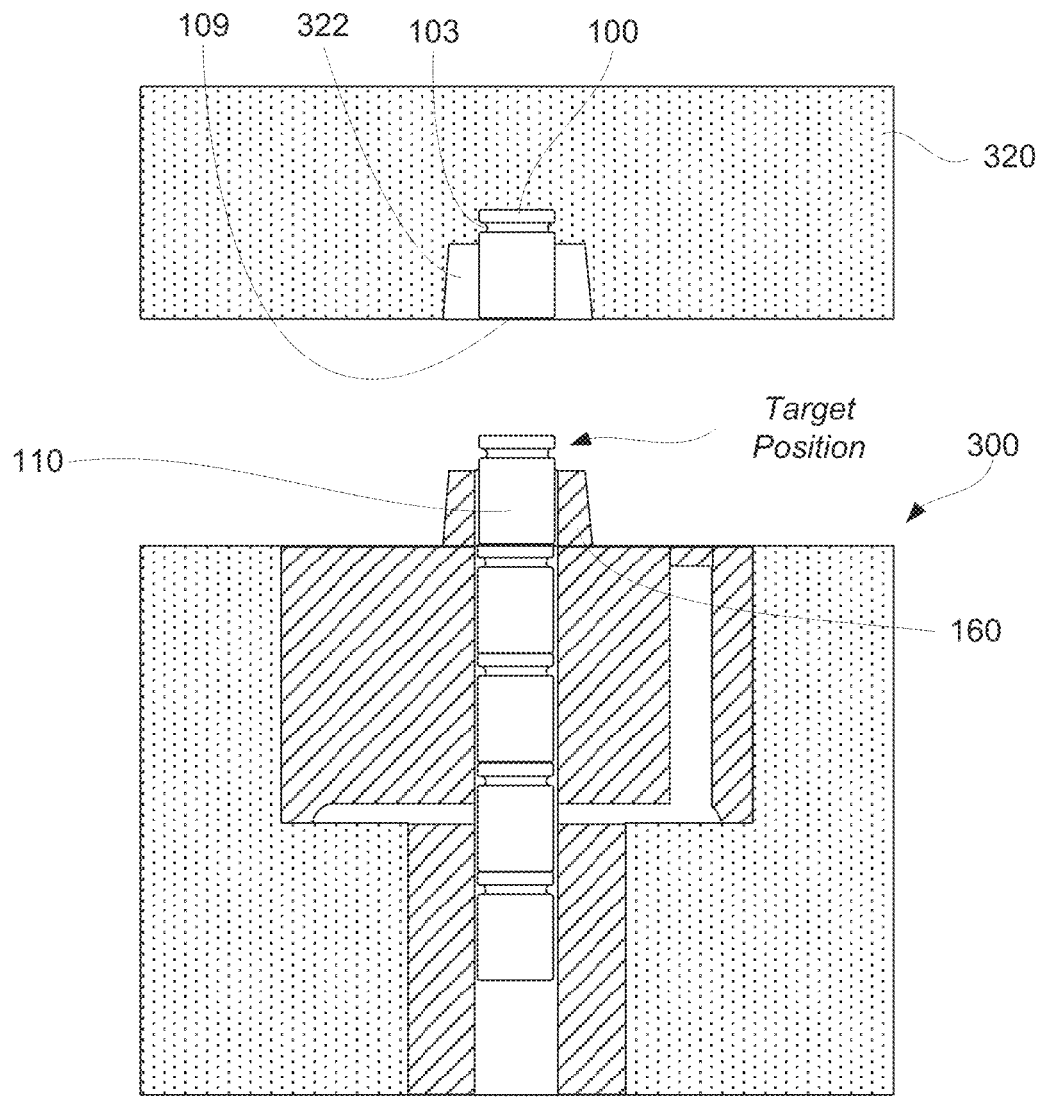

FIG. 4E is a schematic cross-sectional view of a layup tool and a composite layup after completely separating the composite layup from the layup tool and after detaching the optical magnetic marker from the additional optical magnetic marker, which remains in the target position, in accordance with some examples.

Figure 5A:
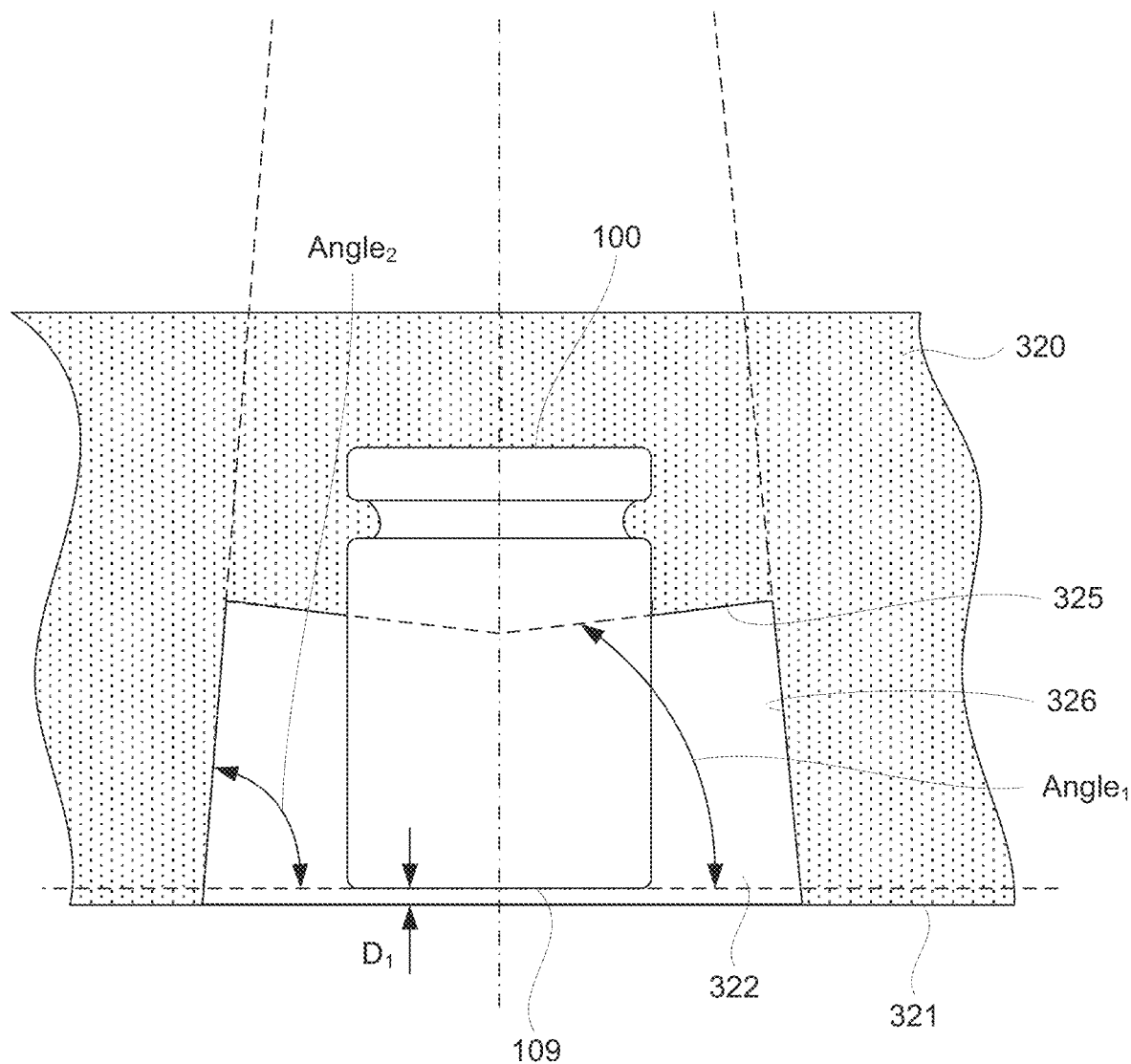

FIG. 5A is an expanded cross-sectional view of a composite layup, showing an optical magnetic marker embedded into the composite layup and partially surrounded by a layup cavity, in accordance with some examples.

Figure 5B:
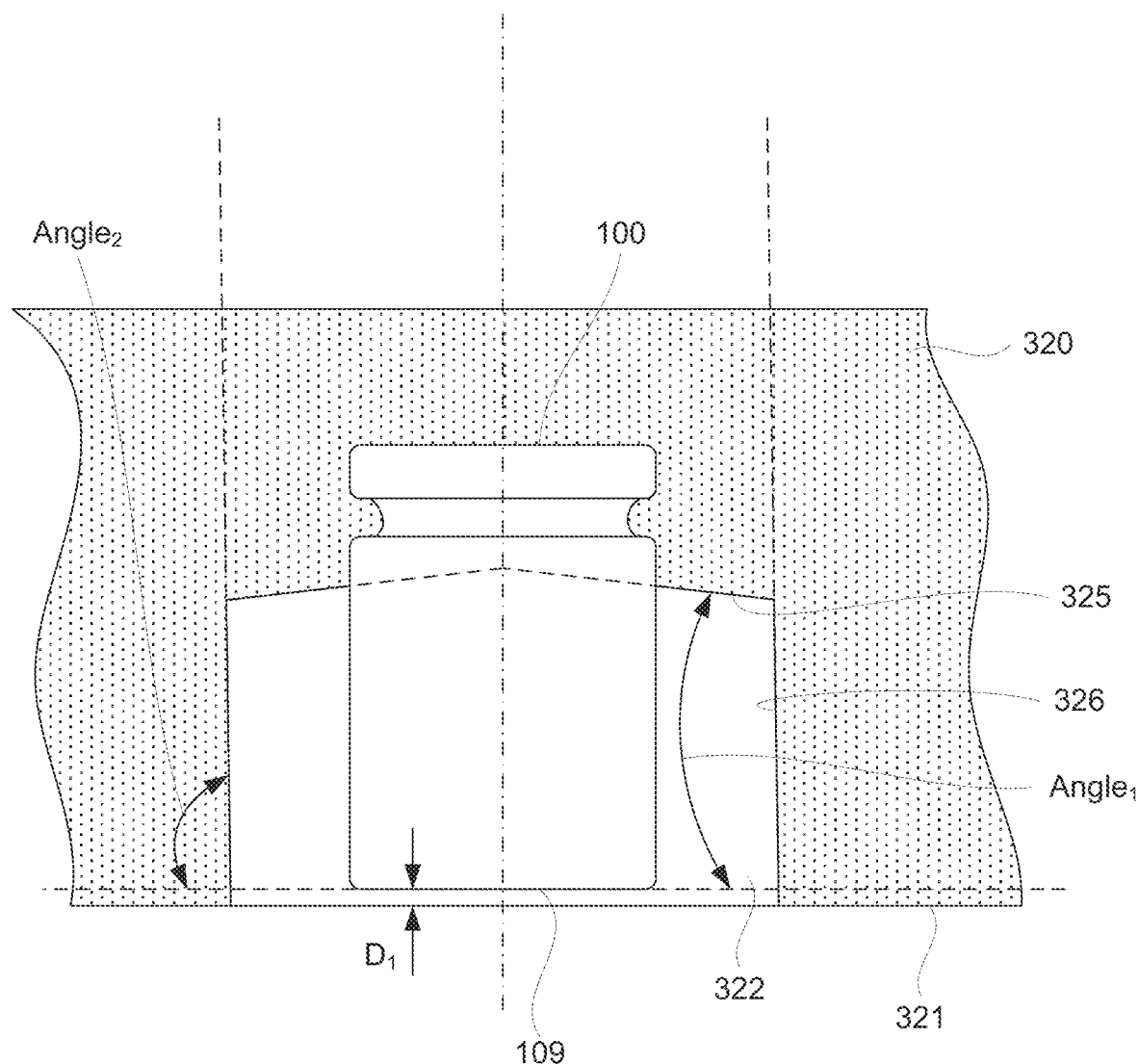

FIG. 5B is an expanded cross-sectional view of another example of a composite layup, showing an optical magnetic marker embedded into the composite layup and partially surrounded by a layup cavity.

Figure 5C:
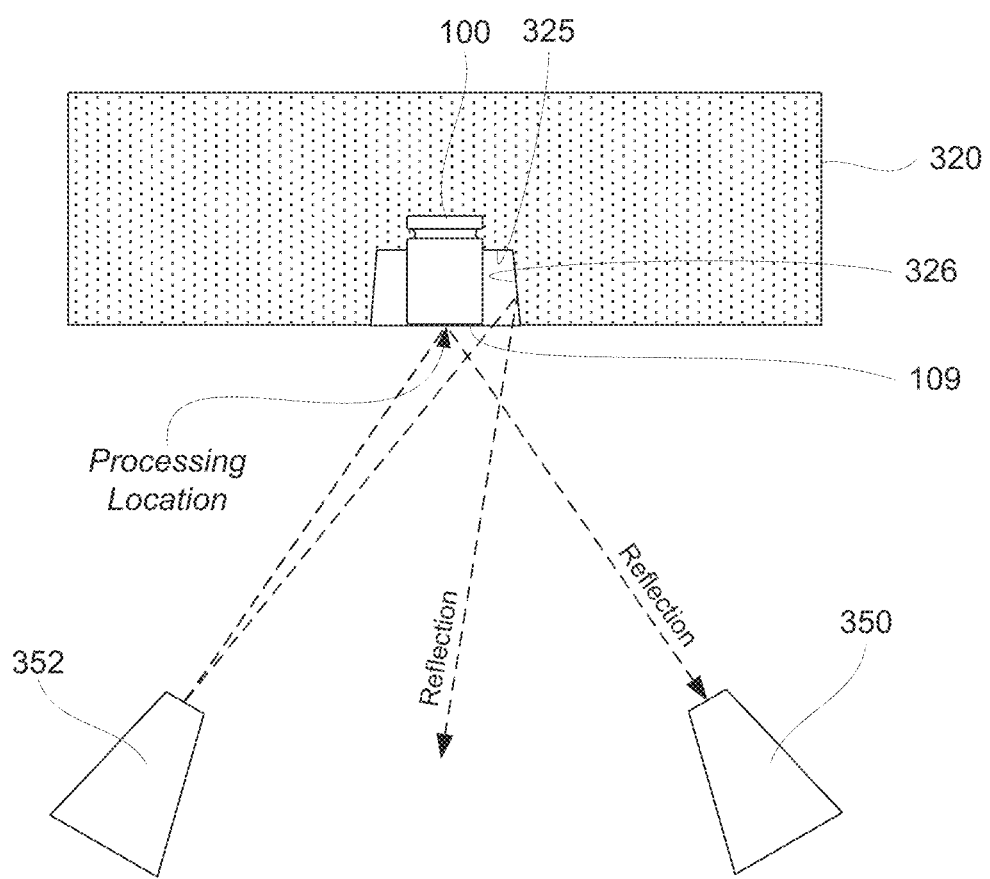

FIG. 5C is a schematic view of a composite layup, during inspection of a processing location, identified with an optical magnetic marker, embedded into the layup tool, in accordance with some examples.

Figure 5D:
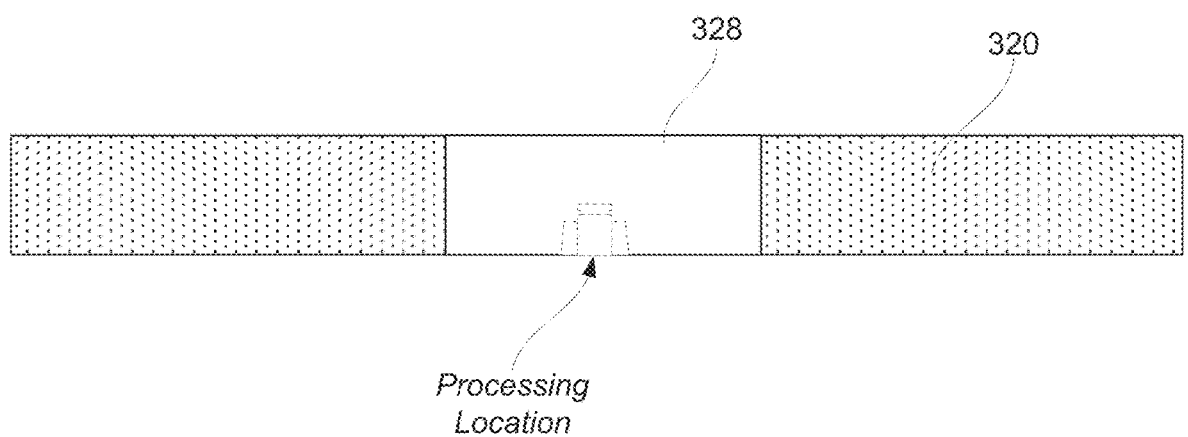

FIG. 5D is a schematic cross-sectional view a composite layup, after processing the composite layup at the processing location, in accordance with some examples.

Figure 6A:
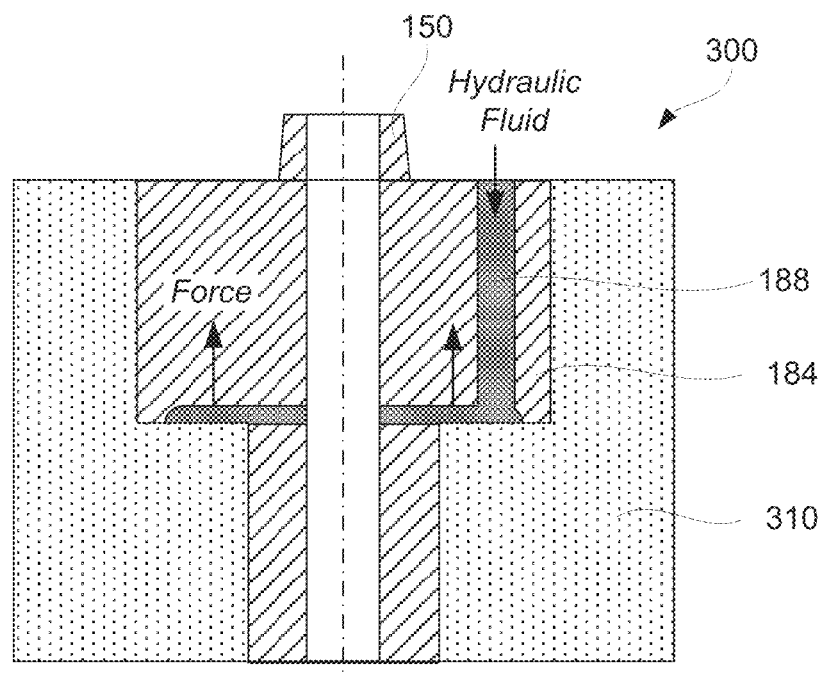
Figure 6B:
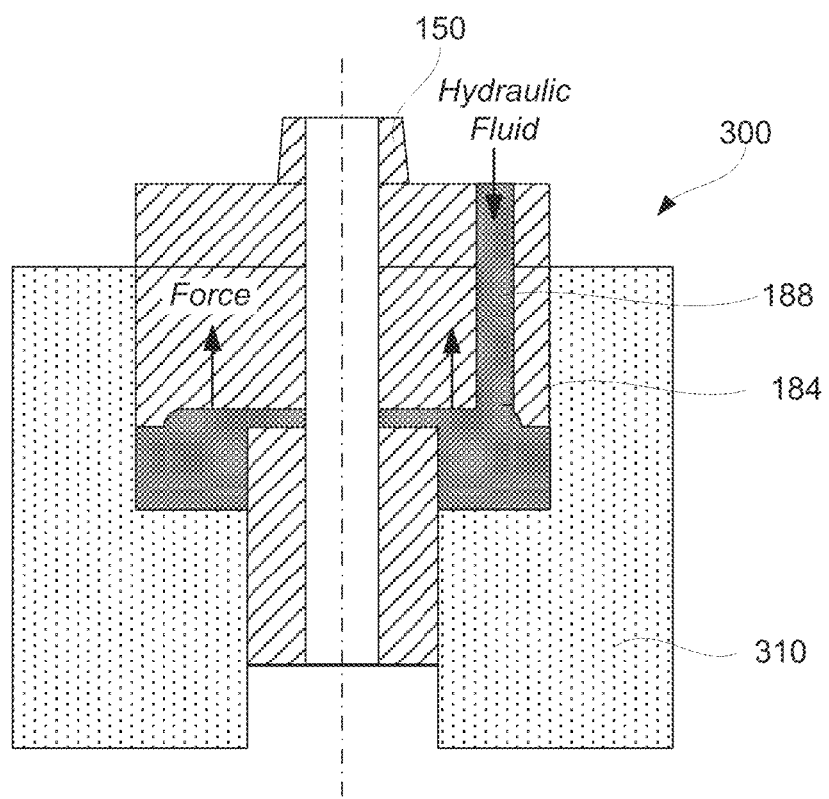
Figure 7:
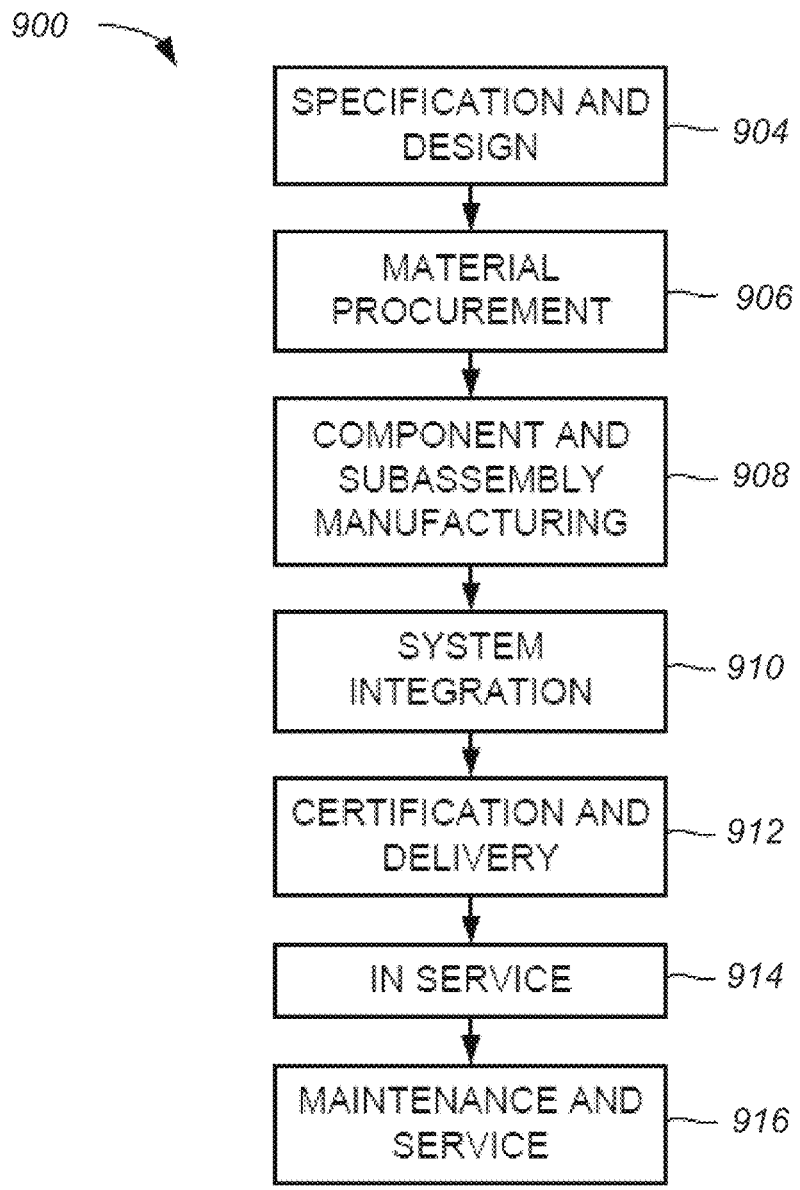

FIGS. 6A and 6B are schematic cross-sectional views of a layup tool during disassembly of the layup tool, in accordance with some examples, FIG. 7 is a process flowchart corresponding to a method for manufacturing and service the aircraft.

Figure 8:
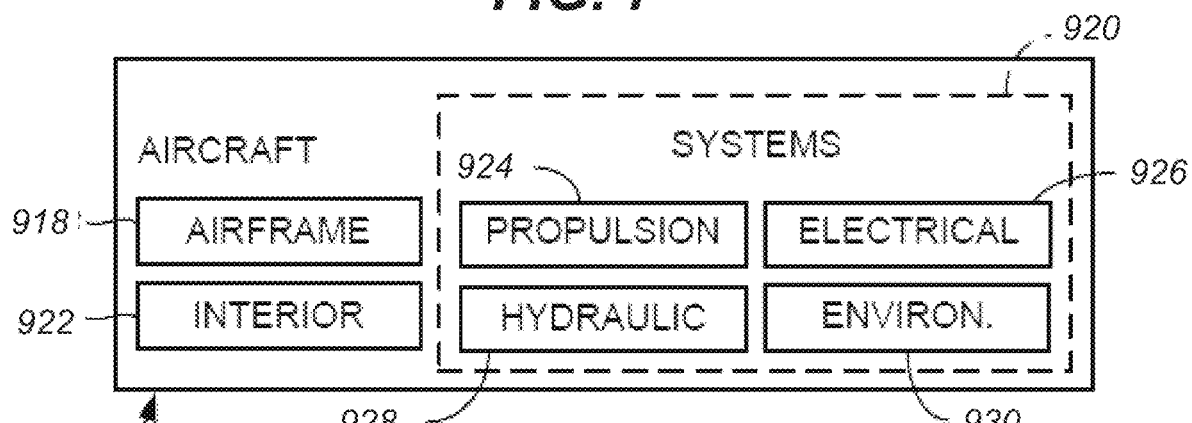

FIG. 8 illustrates a block diagram of an example of an aircraft, in accordance with some examples.

DETAILED DESCRIPTION

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting, Introduction Aircraft manufacturing and other like processes often require high-precision tool positioning and/or identifying processing locations while processing parts, e,g., forming various features, such drilling holes. Many processed components are quite large (e.g., one or more meters in length) and flexible, which interferes with using locating features.

Described herein are methods and systems for precisely identifying processing locations in cured composite layups. A method starts before a composite is cured. Specifically, an optical magnetic marker is magnetically supported in a layup tool at a target position, corresponding to a processing location in a composite layup. This magnetic support to the marker is provided by magnetic forces between the marker and the layup tool. In this target position, a portion of the marker protrudes above the tool processing surface, which later receives the composite layup.

When the composite layup is placed onto the tool processing surface the protruding portion of the marker extends into the composite layup at the processing location in this layup. Thereafter, the composite layup is cured while remaining on the tool processing surface and while the marker protrudes into the composite layup. The marker is adhered to and embedded into the layup during this curing operation. For example., the composite layup conforms to various features of the marker (e.g., an anchor) during curing and then solidifies. After the curing, the optical magnetic marker is an integral component of the cured composite layup and is positioned at the processing location in this layup.

The process continues with separating the cured layup from the tool, which also removes the marker from the tool. Specifically, the adhesion between the marker and the cured layup is stronger than the magnetic forces, which have been previously supporting the marker in the target position. As such, the magnetic forces can no longer retain the embedded marker when a greater external force is applied to separate the cured layup from the tool causing the marker to move from the target position and eventually be removed from the tool In some examples, the process described above is repeated for additional composite layups. For example, the layup tool stores a plurality of optical magnetic markers at the same tool location, which corresponds to the processing location of composite layups. Once an embedded marker is retrieved from the layup tool (e.g., when the cured composite layup is separated from the tool), a new marker is magnetically advanced to the target position and the process is repeated with a new composite layup. The new marker is advanced by the magnetic forces between the new marker and the layup tool. Furthermore, in some examples, two adjacent markers are magnetically attracted to each other. Therefore, when the embedded marker is retrieved from the tool, the embedded marker also helps the new marker to advance into the target position. Thereafter, the embedded marker is separated from the new marker, and the new marker remains in the target position, waiting for a new composite layup and the entire process to repeat.

After the cured composite layup is separated from the tool, the embedded marker identifies the processing location in the layup. Specifically, marker's reflective surface provides a high level of optical contrast, when the layup surface (formed in contact with the tool processing surface) is inspected to determine the processing location. Furthermore, in some examples, a portion of the marker is surrounded by a layup cavity, specifically configured to enhance the optical contrast. The layup cavity is formed by a portion of the tool (e.g., a magnetic retention ring), which surrounds the marker while the marker is being embedded into the composite layup. In some examples, this portion of the tool is also used to advance and retain the market in the target position. Therefore, the features of the layup cavity and the embedded marker are well aligned.

Finally, once the processing location is identified with the assistance from the optical magnetic marker, the cured layup is processed at that location. In some examples, the marker is consumed during this processing. Furthermore, the cavity around the marker is also consumed during this operation, in some example. In these examples, an opening formed at the processing location has a size larger than that of the marker and the cavity.

Overall, the described methods and systems provide accurate, repeatable, and efficient ways to mark composite parts at specific processing locations, irrespective of surface complexities and flexibility of these composite parts. A reflective surface of the embedded marker represents an easily acquired optical point on the surface of the composite layup, which may otherwise be challenging to inspect. This optical point marks a processing location for subsequent processing (e.g., machining) of the composite layup. For purposes of this description, composite parts are also referred to as cured composite layups or, simply, composite layups. For simplicity, a term "composite layup" is used for a layup before and after curing.

Examples of Optical Magnetic Markers, Dispensers, and Layup Tools

FIG. 1A is a schematic illustration of optical magnetic marker 100, in accordance with some examples. Optical magnetic marker 100 comprises non-magnetic portion 102 and magnetic portion 104, which is offset relative to non-magnetic portion 102 along marker center axis 101. As further described below, non-magnetic portion 102 is used for adhering/embedding into composite layup 320. Magnetic portion 104 is used for advancing optical magnetic marker 100 into a target position at layup tool 300 and then supporting optical magnetic marker 100 in that target position while composite layup 320 is placed over layup tool 300 and cured.

In some examples, the height of non-magnetic portion 102, along marker center axis 101, is less than that of magnetic portion 104. For example, the height of non-magnetic portion 102 is between about 20% and 40% of the overall height of optical magnetic marker 100. The height of non-magnetic portion 102 is selected to ensure adhesion of optical magnetic marker 100 to composite layup 320. This desired adhesion is sufficient for retrieval of optical magnetic marker 100 from optical magnetic marker dispenser 150, which applies magnetic forces to retain optical magnetic marker 100 in the target position. Furthermore, this adhesion is sufficient for retaining optical magnetic marker 100 at the processing location while handling and inspecting composite layup 320.

In some examples, the overall height of optical magnetic marker 100 is between 0.25 millimeters and 2 millimeters or, more specifically, between 0.5 millimeters and 1 millimeter, such as 0.75 millimeters. The overall height is selected to ensure that optical magnetic marker 100 is consumed or otherwise removed from composite layup 320 during later processing composite layup 320, e.g., after determining the processing location with assistance of optical magnetic marker 100.

The height of magnetic portion 104 is selected to ensure sufficient magnetic forces between optical magnetic marker 100 and optical magnetic marker dispenser 150 or, more specifically, between optical magnetic marker 100 and magnetic retention ring 160 of optical magnetic marker dispenser 150. A larger height of magnetic portion 104 ensures stronger magnetic forces and stronger retention of optical magnetic marker 100 in the target position by magnetic retention ring 160. Magnetic materials of optical magnetic marker 100 and magnetic retention ring 160 also determine these magnetic forces.

In some examples, non-magnetic portion 102 of optical magnetic marker 100 comprises anchor 103. Anchor 103 is used to ensure that optical magnetic marker 100 cannot be easily pulled out of composite layup 320 after embedding into and curing composite layup 320. More specifically, anchor 103 ensures that optical magnetic marker 100 is retained at the processing location in composite layup 320 when composite layup 320 is separated from layup tool 300 and while the magnetic forces from magnetic retention ring 160 resist optical magnetic marker 100 from leaving the target position. In other words, the retention provided by anchor 103 is stronger than the magnetic forces between magnetic portion 104 of optical magnetic marker 100 and magnetic retention ring 160 of optical magnetic marker dispenser 150.

Referring to FIG. 1A, in some examples, anchor 103 is a radial recess. When composite layup 320 is being cured, a portion of composite layup 320 extends into this recess and conforms to the external surface of optical magnetic marker 100. This conformality, coupled with the strength of the composite layup 320 after curing, ensures that optical magnetic marker 100 cannot be pulled out of composite layup 320 when composite layup 320 is separated from layup tool 300 as, for example, schematically shown in FIGS. 4B-4E.

Another example of anchor 103 is shown in FIG. 13, In this example, anchor 103 is a bulb-shaped cavity. When composite layup 320 is cured, a portion of composite layup 320 extends into this cavity and conforms to the internal surfaces of the cavity. Similar to the previous example, a portion of compo layup 320, cured within this bulb-shaped cavity, ensures that optical magnetic marker 100 cannot be pulled out of composite layup 320 when optical magnetic marker 100 is retrieved from layup tool 300.

Referring to FIGS. 1A and 1B, magnetic portion 104 comprises reflective surface 109, which provides optical contrast during inspection of composite layup 320 into which optical magnetic marker 100 is embedded to. This optical contrast allows precisely determining the location of optical magnetic marker 100 in composite layup 320, which corresponds to the processing location.

In some examples, reflective surface 109 is formed by a nickel coating or a silver coating. The nickel coating provides reflection and optical contrast relative to composite layup 320. In some examples, reflective surface 109 is perpendicular to marker center axis 101. This perpendicularity feature allows determining the location of optical magnetic marker 100 from various angles and positions around to marker center axis 101.

In some examples, reflective surface 109 comprises various features, such as a combination of one or more reflective features and one or more absorptive features. For example, the reflective and absorptive features are arranged into a non-circular pattern, specifically configured for optical detector 350. In some examples, the reflective features are provided by a nickel coating, while absorptive features are provided by a black printing over the nickel coating or the silver coating.

In some examples, magnetic portion 104 of optical magnetic marker 100 is diametrically magnetized. This feature is used to assist with advancing optical magnetic marker 100 into the target position at layup tool 300, as further described below with reference to FIGS. 3C-3H. Specifically, optical magnetic marker 100, which is diametrically magnetized, is turned while being advanced within layup tool 300, which also has a diametrically magnetized component. The turning allows first to reduce repulsion magnetic forces and then to transition from the repulsion magnetic forces to attracting magnetic forces.

In some examples, magnetic portion 104 of optical magnetic marker 100 comprises a neodymium magnet. Neodymium magnet is one of the strongest permanent magnets. However, other types of permanent magnets are also within the scope. Furthermore, as further described below with reference to FIG. 5D, optical magnetic marker 100 is consumed during process of composite layup 320. Neodymium magnet is easily processable by conventional tools, such as drill, mill, and the like.

In some examples, optical magnetic marker 100 has a cylindrical shape. The cylindrical shape allows turning optical magnetic marker 100 around marker center axis 101, e.g., when optical magnetic marker 100 is inside layup tool 300 and is advanced into the target position, as further described below with reference to FIGS. 3C-3H. In some examples, the diameter of optical magnetic marker 100 is between 0.2 millimeters and 1 millimeter or, more specifically, between 0.4 millimeters and 0.8 millimeters.

FIG. 1C is a schematic representation of optical magnetic marker dispenser 150, in accordance with some examples. When in use, optical magnetic marker dispenser 150 is installed in layup tool 300 at a location corresponding to the processing location of composite layup 320, which is formed using layup tool 300. It should be noted that, in some examples, multiple optical magnetic marker dispensers are installed in the same layup tool. In these examples, each optical magnetic marker dispenser corresponds to a different processing location. A location in layup tool 300, where optical magnetic marker dispenser 150, is installed is referred to a tool location. Each tool location on layup tool 300 corresponds to a different processing location in composite layup 320, which is formed using layup tool 300.

FIG. 1C illustrates plurality of optical magnetic markers 111, loaded into optical magnetic marker dispenser 150, Optical magnetic marker dispenser 150 allows plurality of optical magnetic markers 111 to move along dispenser center axis 152. More specifically, optical magnetic marker dispenser 150 is configured to magnetically advance the leading one of plurality of optical magnetic markers 111 into a target position and to magnetically retain this leading optical magnetic marker in the target position while composite layup 320 is placed over layup tool 300 and cured, FIG. 1C illustrates optical magnetic marker 100 of plurality of optical magnetic markers 111 in the target location. In this example, optical magnetic marker 100 is the leading one of plurality of optical magnetic markers 111, Once optical magnetic marker 100 is removed from optical magnetic marker dispenser 150 (after curing composite layup 320), the next one of plurality of optical magnetic markers 111 becomes the leading marker and is moved into the target position.

Specifically, optical magnetic marker dispenser 150 allows loading and removal of plurality of optical magnetic markers 111. For example, FIG. 1C illustrates optical magnetic marker 100 being in the target location. When, after curing, composite layup 320 is separated from layup tool 300, optical magnetic marker 100 is pulled by composite layup 320 and removed from layup tool 300. The magnetic forces acting on optical magnetic marker 100, forcing optical magnetic marker 100 back into the target position, are not sufficient to keep optical magnetic marker 100 in the target position and optical magnetic marker 100 is removed from optical magnetic marker dispenser 150. At the same time, additional optical magnetic marker 110, identified in FIG. 1C, is advanced into the target position, e.g., using a combination of the magnetic forces between optical magnetic marker 100 and additional optical magnetic marker 110 and also the magnetic forces between additional optical magnetic marker 110 and optical magnetic marker dispenser 150.

Figure 1D:
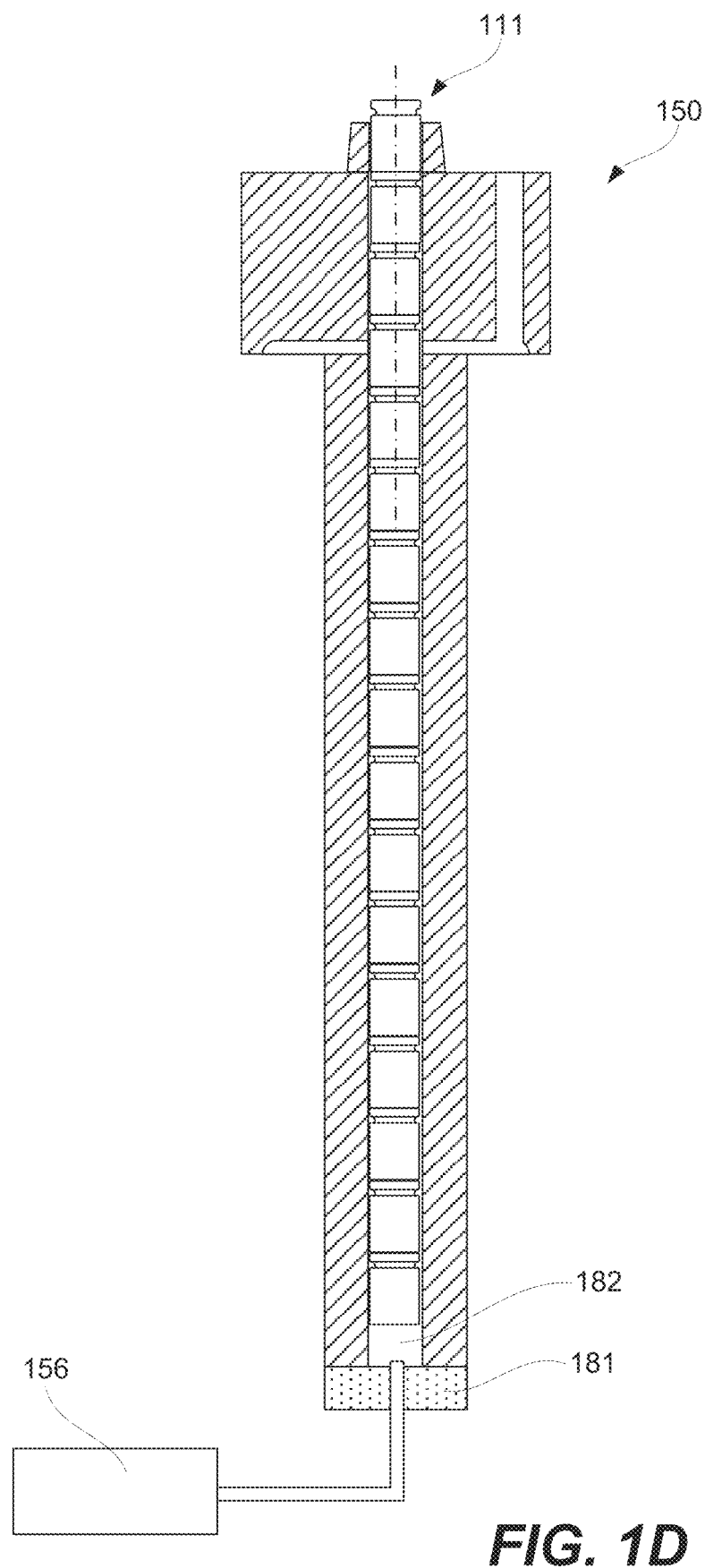
FIG. 1D is a schematic cross--sectional view of a magnetic dispenser comprising a pressure controller, fluidically coupled to a marker supporting cavity, in accordance with some examples.

Optical magnetic marker dispenser 150 comprises magnetic retention ring 160 and magazine 170, connected to magnetic retention ring 160. Referring to FIG. 1F, magnetic retention ring 160 comprises first end 161 and second end 162, opposite of first end 161 along dispenser center axis 152. Magnetic retention ring 160 is magnetized. For example, magnetic retention ring 160 comprises a neodymium magnet. During operation of optical magnetic marker dispenser 150, magnetic retention ring 160 exerts magnetic forces on optical magnetic marker 100 thereby forcing optical magnetic marker 100 into the target position and retaining optical magnetic marker 100 in the target position as, for example, is shown in FIG. 1C. More specifically, magnetic retention ring 160 exerts magnetic forces on magnetic portion 104 of optical magnetic marker 100. In the target position of optical magnetic marker 100, magnetic portion 104 is inserted within magnetic retention ring 160, while non-magnetic portion 102 extends from magnetic retention ring 160 (and used for engaging with composite layup 320 at a later stage).

In some examples, magnetic retention ring 160 is diametrically magnetized. This feature is used to assist with advancing optical magnetic marker 100 into the target position at layup tool 300, as further described below with reference to FIGS. 3C-3H. Specifically, optical magnetic marker 100 is turned relative to magnetic retention ring 160, while being advanced within optical magnetic marker dispenser 150. This turning first allows to reduce repulsion magnetic forces and then to transition from repulsion magnetic forces to attracting magnetic forces.

Referring to HG. 1F, magnetic retention ring 160 comprises leading surface 164 and side surface 163. Leading surface 164 is positioned at first end 161 of magnetic retention ring 160. During operation of layup tool 300, leading surface 164 faces composite layup 320 and is inserted into composite layup 320. More specifically, leading surface 164 defines the shape of bottom surface 325 of layup cavity 322, as further described below with reference to FIG. 4A-4E and FIG. 5A. In some example, leading surface 164 is non-perpendicular to dispenser center axis 152. In other words, the smallest angle between leading surface 164 and dispenser center axis 152 is less than 90'. For example, leading surface 164 is tilted toward magazine 170 as leading surface 164 extends toward dispenser center axis 152. Alternatively, leading surface 164 is tilted away from magazine 170 as leading surface 164 extends toward dispenser center axis 152. This feature is used to ensure that bottom surface 325 of layup cavity 322 is not parallel to reflective surface 109 of optical magnetic marker 100 to provide optical contrast during inspection of composite layup 320 as further described below with reference to FIGS. 5A-5C.

Referring to FIG. IF, side surface 163 of magnetic retention ring 160 extends between first end 161 and second end 162 and, in some examples, is non-parallel to dispenser center axis 152. In other words, the angle between side surface 163 and dispenser center axis 152 is greater than 0°. During operation of layup tool 300, side surface 163 defines the shape of side surface 326 of layup cavity 322, as further described below with reference to FIG. 4A-4E and FIG. 5A, thereby ensuring optical contrast during inspection of composite layup 320.

Referring to FIG. IF, optical magnetic marker dispenser 150 further comprises marker supporting cavity 182, extending through magazine 170 and magnetic retention ring 160. Marker supporting cavity 182 is open at first end 161 of magnetic retention ring 160. This opening allows optical magnetic marker 100 to partially extend from optical magnetic marker dispenser 150 when optical magnetic marker 100 is in the target position as, for example, is shown in FIG. 1C. Furthermore, this opening is used, in some examples, to load plurality of optical magnetic markers 111 into optical magnetic marker dispenser 150 or, more specifically, into marker supporting cavity 182. Alternatively, optical magnetic markers 111 are loaded marker supporting cavity 182 through an opposite end of marker supporting cavity 182. In some examples, marker supporting cavity 182 has a cylindrical cross-section in the direction perpendicular to dispenser center axis 152. This feature allows plurality of optical magnetic markers 111 to turn while within marker supporting cavity 182.

Referring to HG. 1D, in some example, marker supporting cavity 182 is sealed at an end opposite to first end 161 of magnetic retention ring 160. For example, magazine end cap 181 is used for sealing as shown in FIG. 1C. In some examples, magazine end cap 181 is removable, e.g., to load plurality of optical magnetic markers 111 into marker supporting cavity 182.

In some examples, magazine 170 is magnetized, e.g., to support plurality of optical magnetic markers 111 within marker supporting cavity 182. The strength of magnetic forces between magazine 170 and plurality of optical magnetic markers 111 is less than that of magnetic forces between optical magnetic marker 100 and magnetic retention ring 160 when optical magnetic marker 100 is at the target location. This difference allow for each of plurality of optical magnetic markers 111 to advance into the target position, when its turn. Furthermore, the strength of magnetic forces between magazine 170 and plurality of optical magnetic markers 111 is less than that between the magnetic forces between any two adjacent one of plurality of optical magnetic markers 111. This difference ensures that plurality of optical magnetic markers 111 remain together while advancing within marker supporting cavity 182.

Referring to FIG. 1F, in some examples, magazine 170 comprises magazine neck 186 and magazine collar 184. Magazine collar 184 has a larger diameter than magazine neck 186. Magazine collar 1.84 is attached to magnetic retention ring 160 such that magazine collar 184 is disposed between magnetic retention ring 160 and magazine neck 186. Magazine collar 184 is configured to press-fit or thread into layup tool base 310 as, for example, is shown in FIGS. 3A-3B.

Referring to FIG. 1F, in some examples, magazine 170 comprises removal port 188, extending through magazine collar 184 and forming a portion of a neck-facing surface 185 of magazine collar 184. Removal port 188 allows hydraulic fluid to flow toward neck-facing surface 185 and push magazine collar 184 away from layup tool base 310, as further described below with reference to FIGS. 6A and 6B. Furthermore, magazine 170 comprises port plug 189, which isolates removal port 188 from the environment and, for example, prevents composite layup 320 from flowing into removal port 188. In some examples, port plug 189 is flush with a remaining portion of magazine processing surface 183.

In some examples, magazine collar 184 comprises magazine processing surface 183, interfacing with second end 162 of magnetic retention ring 160 such that side surface 163 of magnetic retention ring 160 extends to magazine processing surface 183. In some examples, side surface 163 is non-perpendicular (the smallest angle is less than 90°) to magazine processing surface 183. Magazine processing surface 183 forms tool-defined surface 321 of composite layup 320. It should be noted that magnetic retention ring 160 does not form any parts of magazine processing surface 183. Instead, magnetic retention ring 160 defines layup cavity 322, which is surrounded by tool-defined surface 321 as, further described below with reference to FIG. 5A.

Figure 1E:
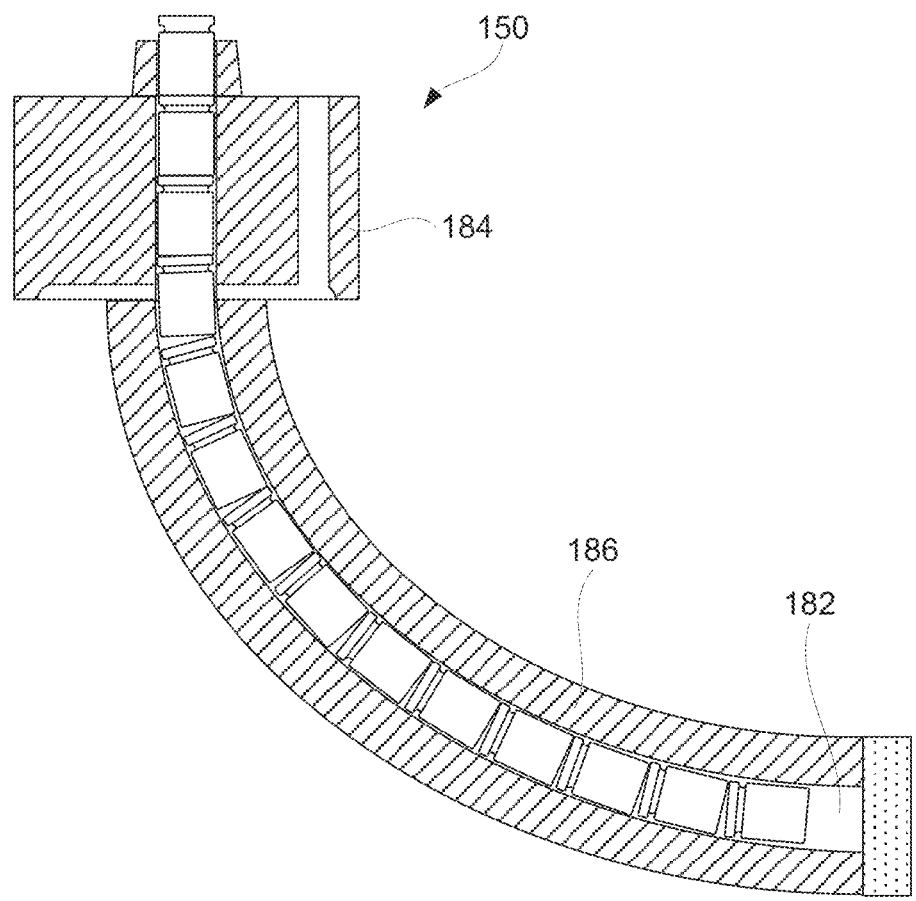
FIG. 1E is a schematic cross-sectional view of a magnetic dispenser comprising a curved magazine neck, in accordance with some examples.
Figure 1F:
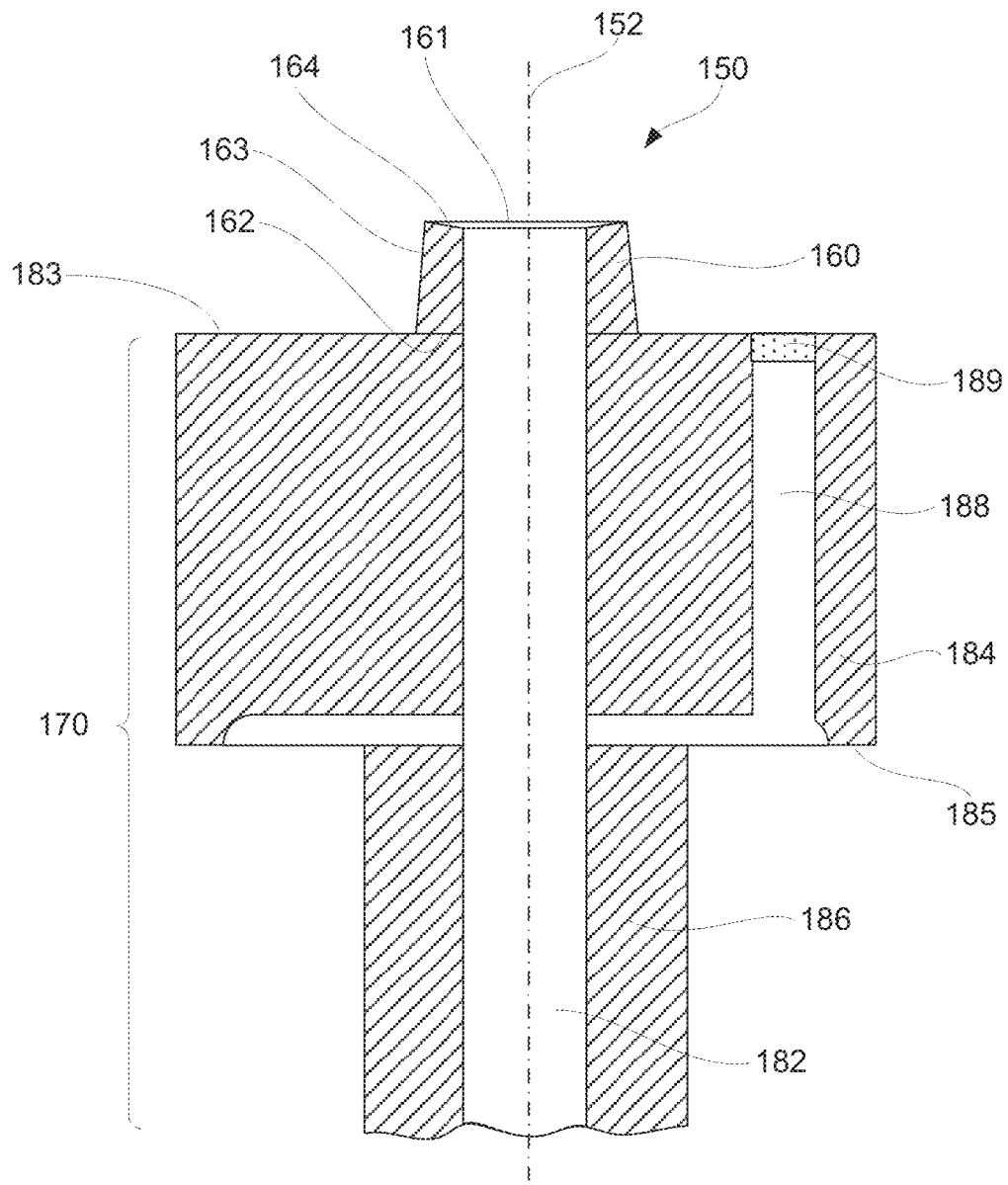
FIG. 1A is a schematic illustration of an optical magnetic marker, in accordance with some examples.
FIG. 1B is a schematic cross-sectional view of another example of the optical magnetic marker, comprising a bulb-shaped cavity, used an anchor.
FIG. 1C is a schematic cross-sectional view of a magnetic dispenser showing a plurality of optical magnetic markers positioned within and supported by the magnetic dispenser, in accordance with some examples.

Referring to FIG. 1E, in some examples, magazine neck 186 is curved or flexible. This feature allows positioning magazine neck 186, having a large length, in constrained spaces, e.g., magazine neck 186 is able to protrude through composite layup 320 with a small thickness. The large length of allows positioning a larger number of optical magnetic markers into marker supporting cavity 182.

Referring to FIG. 1D, in some examples, optical magnetic marker dispenser 150 further comprises pressure controller 156, fluidically coupled to marker supporting cavity 182. Pressure controller 156 is used to maintain the pressure inside marker supporting cavity 182, in particular, the pressure in the space between optical magnetic marker 100, at the target position, and magnetic retention ring 160 while composite layup 320 is being cured, This pressure control ensures that composite layup 320 does not protrude into the space between optical magnetic marker 100 and magnetic retention ring 160. The pressure control also ensures that gas bubbles are not introduced into composite layup 320 around magnetic retention ring 160 when composite layup 320 is being cured.

FIG. 3A illustrates layup tool 300 during its assembly, prior to installing into optical magnetic marker dispenser 150 into layup tool base 310. FIG. 3B illustrates layup tool 300 after the assembly is completed. Layup tool base 310 comprises base processing surface 313 and base cavity 312. Magazine 170 of optical magnetic marker dispenser 150 protrudes into base cavity 312 and supported within base cavity 312 by layup tool base 310. In some examples, magazine 170 or, more specifically, magazine neck 186 is press-fit or threaded into base cavity 312.

Referring to FIG. 38, in some examples, magazine processing surface 183 is coplanar with base processing surface 313. Magazine processing surface 183 and base processing surface 313 collectively form tool processing surface 303. Tool processing surface 303 defines the shape of tool-defined surface 321 of composite layup 320 when composite layup 320 is placed and cured over layup tool 300. It should be noted that tool processing surface 303 does not have to be planar and, in some examples, have various features as required by the design of tool-defined surface 321.

As shown in FIGS. 38 and 6A-6B removal port 188 of magazine 170 is in fluid communication with layup tool base 310. When hydraulic fluid is flown into removal port188, the hydraulic fluid applies force to magazine 170, or more specifically, to magazine collar 184 away from layup tool base 310 and along dispenser center axis 152. This feature is used for extraction of magazine collar 184 from layup tool base 310 as further described below with reference to FIGS. 6A and 68.

Referring to FIG. 3B, in some examples, magazine 170 extends through layup tool base 310. This feature allows using magazine 170 that is long and accommodates a larger number of optical magnetic markers, Furthermore, this feature allows accessing marker supporting cavity 182 at an end opposite to magnetic retention ring 160, e.g., for loading optical magnetic markers and/or connecting to pressure controller as, for example, is shown in FIG. 1D.

Processing Examples

FIG. 2 is a process flowchart that represents method 200 for marking composite layup 320 with optical magnetic marker 100, in accordance with some examples. Various examples of composite layup 320 are within the scope. In some example, composite layup 320 is an aircraft component, such as a fuselage component, a wing structure, or a like. Method 200 is used to precisely identify at least one processing location in composite layup 320 such that optical magnetic marker 100 is embedded at that location. Method 200 is repeatable for any number of composite layups such that the processing location is precisely and repeatedly identified in each of the composite layups. For simplicity and consistency, the term "composite layup" is used through all operating stages including curing and post-curing processing.

In some examples, method 200 comprises assembling layup tool 300 (block 210). Various features and components of layup tool 300, such as optical magnetic marker dispenser 150 and layup tool base 310, are described above with reference to FIGS. 1A-1F. Referring to FIGS. 3A and 3B, during this operation, optical magnetic marker dispenser 150 is attached to layup tool base 310. More specifically, magazine 170 of optical magnetic marker dispenser 150 is inserted into base cavity 312 of layup tool base 310. In some examples, magazine 170 or, more specifically, magazine collar 184, is press-fit or threaded into layup tool base 310. After completing this operation, base processing surface 313 of layup tool base 310 is coplanar with magazine processing surface 183 of magazine 170 as, for example, is shown in FIG. 3B. Tool processing surface 303 represents a combination of base processing surface 313 and magazine processing surface 183 and defines the shape of tool-defined surface 321 of composite layup 320.

In some examples, method 200 comprises loading optical magnetic marker dispenser 150 with plurality of optical magnetic markers 111 (block 220), FIG. 38 illustrates optical magnetic marker dispenser 150 already loaded with plurality of optical magnetic markers 111 such that plurality of optical magnetic markers 111 are positioned within marker supporting cavity 182. For example, plurality of optical magnetic markers 111 is loaded through an opening at first end 161 of magnetic retention ring 160. Alternatively, plurality of optical magnetic markers 111 is loaded through an opening in loading magnetic marker dispenser 150, opposite to first end 161.

It should be noted that during and after the loading operation, each pair of adjacent markers are magnetically attracted to each other, such that plurality of optical magnetic markers 111 is loaded into and kept within magnetic marker dispenser 150 as one interconnected set. Furthermore, in some examples, plurality of optical magnetic markers 111 are magnetically supported by magazine 170, e.g., to support plurality of optical magnetic markers 111 within marker supporting cavity 182.

Method 200 comprises advancing optical magnetic marker 100 into the target position at layup tool 300 (block 230). This operation is schematically shown in FIGS. 3C and 3D, Referring to FIG. 3D, in the target position, anchor 103 protrudes above and away from layup tool 300 or, more specifically, above and from magnetic retention ring 160 of layup tool 300. This protrusion allows anchor 103 to engage and adhere to composite layup 320 when composite layup 320 is placed over layup tool 300, as further described below.

In some examples, optical magnetic marker 100 is advanced into the target position while optical magnetic marker dispenser 150 is loaded with plurality of optical magnetic markers 111. In other words, the operation represented by block 230 occurs during the operation represented by block 220, e.g., the two operations coincide. In these examples, optical magnetic marker 100 is a leading marker or, more specifically, the marker closest to magnetic retention ring 160, among plurality of optical magnetic markers 111.

Furthermore, in some examples, optical magnetic marker 100 is advanced into the target position while another one of plurality of optical magnetic markers 111 is removed from optical magnetic marker dispenser 150. For example, a previously leading marker, which optical magnetic marker 100 follows in the set, has been embedded into another composite layup. This composite layup is separated from layup tool 300 thereby extracting this other marker from layup tool 300. After extracting this other marker, optical magnetic marker 100 becomes a leading marker ready for embedding into composite layup 320. This operation is repeatable a number of times, not exceeding the number of markers in plurality of optical magnetic markers 111 This example is further described below with reference to block 250, block 262, and block 264.

As described above, magnetic retention ring 160 is configured to advance optical magnetic marker 100 to the target position by applying magnetic forces to optical magnetic marker 100. One example of a magnetic force profile, as a function of the marker position along dispenser center axis 152, is shown in FIG. 3E, The magnetic force profile identifies repulsion magnetic forces (less than 0) and attraction magnetic forces (greater than 0). These repulsion and attraction magnetic forces exist at different positions of optical magnetic marker 100 due to the orientation of magnetic fields created by optical magnetic marker 100 and magnetic retention ring 160. The forces change as optical magnetic marker 100 moves along dispenser center axis 152.

FIG. 3E also identifies three illustrative positions (Position 0, Position 1, and Position 2) of optical magnetic marker 100 relative to magnetic retention ring 160, in addition to the target position. At "Position 0", optical magnetic marker 100 is far away from magnetic retention ring 160 such that no detectable magnetic forces exist between these two components. As optical magnetic marker 100 gets closer to magnetic retention ring 160, magnetic retention ring 160 initially repulses optical magnetic marker 100, due to the orientation of magnetic fields as noted above. The repulsion magnetic forces are at the maximum at "Position 1". After passing this maximum repulsion position, the repulsion magnetic forces reduce. Eventually, after passing "Position 2", magnetic retention ring 160 applies attractions forces to optical magnetic marker 100. FIG. 3C shows optical magnetic marker 100 located somewhere between "Position 0" and "Position 2". The attraction force is the highest at the target position, which causes optical magnetic marker 100 to move into the target position and to retain in the target position, as shown in HG. 3D. Optical magnetic marker 100 remains in the target position until this maximum attraction force is overcome by a greater external force, e.g., when optical magnetic marker 100 is embedded into composite layup 320 and composite layup 320 is separated from layup tool 300.

FIG. 3E illustrates a challenge associated with moving optical magnetic marker 100 along dispenser center axis 152, which is overcoming the repulsion magnetic force between "Position 0" and "Position 2". While optical magnetic marker 100 can be pushed externally (e.g., plurality of optical magnetic markers 111 is pushed through an open bottom end) through this repulsion region, another approach involves using magnetic retention ring 160 and magnetic portion 104, both of which are diametrically magnetized. This approach will now be described with reference to FIGS. 3F-3H.

Specifically, when each of magnetic retention ring 160 and magnetic portion 104 of optical magnetic marker 100 is diametrically magnetized, turning optical magnetic marker 100 relative to magnetic retention ring 160 (e.g., 90°) converts the repulsion magnetic force to the attraction magnetic force (and vice versa), while optical magnetic marker 100 is at the same position relative to magnetic retention ring 160. Referring to FIG. 3F, optical magnetic marker 100 is turned relative to magnetic retention ring 160 in such a way that optical magnetic marker 100 is first attracted to magnetic retention ring 160 as optical magnetic marker 100 moves from "Position 0" and gets closer to magnetic retention ring 160. The attraction force goes through a maximum and starts declining (similar to but in the inverse manner to the example described above with reference to FIG. 3E), If optical magnetic marker 100 continues along dispenser center axis 152 without any turning, then the attraction force will become into a repulsion force, which will reach its maximum at the target position (inverse of FIG. 3E). This situation may not be desirable since optical magnetic marker 100 will not remain in the target position unless supported by some larger external force. Instead, as the attraction force starts declining, optical magnetic marker 100 is turned 90°. In some examples, the turning operation is dynamic such that optical magnetic marker 100 is being advanced along dispenser center axis 152 while being turned. FIG. 3H illustrates "Position 1a" as the beginning of the turning and "Position 2a" as the end of the turning. Because of the diametrically magnetized feature of magnetic retention ring 160 and magnetic portion 104 of optical magnetic marker 100, expected repulsion forces switch to attraction forces (dynamically between "Position 1a" and "Position 2a") allowing optical magnetic marker 100 to travel and retain in the target position where the attraction forces are at the maximum.

Overall, advancing optical magnetic marker 100 into the target position and maintaining optical magnetic marker 100 at the target position are performed using the magnetic forces between optical magnetic marker 100 and magnetic retention ring 160 of layup tool 300. More specifically, the magnetic forces causes specific alignment of magnetic portion 104 and magnetic retention ring 160, corresponding to the target position of optical magnetic marker 100, in which magnetic portion 104 is surrounded by magnetic retention ring 160, In the target position, non-magnetic portion 102 extends from magnetic retention ring 160. When composite layup 320 is placed over layup tool 300, non-magnetic portion 102 extends into and is bonded to composite layup 320.

Method 200 comprises placing composite layup 320 over layup tool 300 (block 240). This operation is schematically shown in FIGS. 4A and 4B, It should be noted that this operation covers (1) composite layup 320 being moved relative to layup tool 300, which is stationary; (2) layup tool 300 being moved relative to composite layup 320, which is stationary; and (3) both composite layup 320 and tool 300 being moved. Furthermore, this operation covers composite layup 320 being placed on top of layup tool 300 and layup tool 300 being placed on top of composite layup 320. More generally, composite layup 320 engages tool processing surface 303 of layup tool 300, In some examples, the pressure is applied onto composite layup 320 during this operation (e.g., using a combination of internal vacuum and external ambient pressure), which forces composite layup 320 against layup tool 300. During this operation, optical magnetic marker 100 is maintained at the target position such that anchor 103 of optical magnetic marker 100 protrudes into and directly engages composite layup 320. In some examples, composite layup 320 conforms to the shape of anchor 103 during this operation, Furthermore, some additional redistribution of composite layup 320 around anchor 103 may occur at later operations.

Method 200 comprises curing composite layup 320 (block 250). For example, compo layup 320 is heated to a set temperature for a set of period of time, In some examples, the pressure is applied onto composite layup 320 during this operation, which forces composite layup 320 against layup tool 300. Composite layup 320 hardens during this operation, and anchor 103 of optical magnetic marker 100 is bonded to composite layup 320. For example, at the beginning of the curing operation, a portion of composite layup 320 flows around anchor 103 and conformally engages the surface of anchor 103. Later during the curing operation, composite layup 320 solidifies around anchor 103 thereby providing support to anchor 103.

In some examples, anchor 103 of optical magnetic marker 100 is a radial recess or any other like feature. In these examples, placing and curing composite layup 320 over layup tool 300 comprises protruding a portion of composite layup 320 into the radial recess.

In some examples, the curing operation further comprises controlling pressure within a space between magnetic retention ring 160 and magnetic portion 104 of optical magnetic marker 100 (block 252). This pressure control prevents composite layup 320 from entering the space between magnetic retention ring 160 and magnetic portion 104. Furthermore, controlling the pressure prevents gas bubbles from trapping in composite layup 320. In some examples, the pressure is controlled dynamically, e.g., based on the temperature, time, and other factors associated with during process.

Method 200 comprises separating composite layup 320 from layup tool 300 (block 260). This operation is performed after curing composite layup 320. At this and later stages, composite layup 320 may be also referred to as a cured composite layup. During this cured-layup separating operation, optical magnetic marker 100 is extracted from layup tool 300 while bonded to composite layup 320. As described above, curing results in optical magnetic marker 100 being into composite layup 320. Even though magnetic retention ring 160 continues forcing optical magnetic marker 100 into the target position, the external force applied to optical magnetic marker 100 as a part of this cured-layup separating operation is greater than the magnetic forces between magnetic retention ring 160 and optical magnetic marker 100.

In some examples, after extracting optical magnetic marker 100 from layup tool 300, reflective surface 109 of optical magnetic marker 100 is radially surrounded by layup cavity 322 as, for example, is shown in FIGS. 4E and 5A. Layup cavity 322 is formed by magnetic retention ring 160, which extends away from tool processing surface 303.

Specifically, FIG. 5A illustrates layup cavity 322 comprising bottom surface 325 and side surface 326. The angle between bottom surface 325 and reflective surface 109 of optical magnetic marker 100 (identified as $Angle_1$ in FIG. 5A) is greater than 0°. In other words, bottom surface 325 and reflective surface 109 are not parallel. Furthermore, the smallest angle between side surface 326 and reflective surface 109 of optical magnetic marker 100 (identified as $Angle_2$ in FIG. 5A) is less than 90°. In other words, side surface 326 and reflective surface 109 are not perpendicular. This feature is used to enhance optical contrast when tool-defined surface 321 is inspected, as further described below. This feature also helps to facilitate removal of the magnetic retention ring 160 from the composite layup 320. Furthermore, after separating composite layup 320 from layup tool 300, magnetic portion 104 extends into layup cavity 322.

FIG. 5B illustrates another example of composite layup 320, in which the angle between bottom surface 325 and reflective surface 109 of optical magnetic marker 100 (identified as $Angle_1$ in FIG. 5B) is also greater than 0°. The smallest angle between side surface 326 and reflective surface 109 of optical magnetic marker 100 (identified as $Angle_2$ in FIG. 5B) is 90°. However, the orientations of bottom surface 325 relative to reflective surface 109 is different than in FIG. 5A. Specifically, layup cavity 322 is the deepest along the center axis than near side surface 326. In a similar manner, the orientations of side surface 326 relative to reflective surface 109 is different than in FIG. 5A. Side surface 326 is parallel to the center axis.

In some examples, when optical magnetic marker 100 is not the only maker provided in layup tool 300, separating composite layup 320 from layup tool 300 (block 260) comprises advancing additional optical magnetic marker 110 into the target position at layup tool 300 (block 262). This operation is schematically shown in FIGS. 4B-4E. Specifically, additional optical magnetic marker 110 is magnetically attracted to optical magnetic marker 100. As such, when composite layup 320 is separated from layup tool 300 and optical magnetic marker 100 is pulled from layup tool 300 or, more specifically, from magnetic retention ring 160 of layup tool 300, optical magnetic marker 100 pulls additional optical magnetic marker 110 into the target position. Furthermore, magnetic retention ring 160 exerts magnetic forces onto additional optical magnetic marker 110 to bring and retain additional optical magnetic marker 110 in the target position. In some examples, advancement of additional optical magnetic marker 110 into the target position is performed automatically without applying any external forces onto plurality of optical magnetic marker 111, besides the one applied to optical magnetic marker 100 by composite layup 320.

Furthermore, separating composite layup 320 from layup tool 300 (block 260) further comprises separating additional optical magnetic marker 110 from optical magnetic marker 100 (block 264). This marker separation occurs when additional optical magnetic marker 110 reaches the target position. At this point, the magnetic forces between additional optical magnetic marker 110 and magnetic retention ring 160 are greater than between additional optical magnetic marker 110 and optical magnetic marker 100. Thereafter, the placing, curing, and separating operations, described above, are repeated with additional optical magnetic marker 110.

In some examples, method 200 further comprises determining the processing location at composite layup 320 (block 270). This operation involves capturing reflection from reflective surface 109 of optical magnetic marker 100 using optical detector 350 as, for example, is schematically shown in FIG. 5C. During this operation, in some examples, the reflection from bottom surface 325 and side surface 326 of layup cavity 322 is not directed at optical detector 350 thereby enhancing the optical contrast with reflective surface 109 of optical magnetic marker 100. Also shown is light source 352, which provides illumination of the inspected area.

In some examples, method 200 further comprises processing composite layup 320 at the processing location (block 280). Some examples of processing include drilling, milling, and the like. FIG. 5D illustrates composite layup 320 after this operation, with opening 328 formed in composite layup 320, In some examples, optical magnetic marker 100 is consumed during this processing operation. For reference, the outline of optical magnetic marker 100 and layup cavity 322 are shown with dashed lines in FIG. SD. The size of opening 328 formed during this processing operation is greater than that of optical magnetic marker 100 and of layup cavity 322.

In some examples, method 200 further comprises disassembling layup tool 300 (block 290). Specifically, optical magnetic marker dispenser 150 is removed from layup tool base 310, One examples of this operation is shown in FIGS. 6A-6B. Hydraulic fluid is flown into removal port 188 thereby forcing magazine collar 184 from layup tool base 310.

Aircraft Examples

In some examples, the apparatus and methods described above are used on aircraft and, more generally, by the aerospace industry. Specifically, the apparatus can be used during fabrication of aircraft as well as during aircraft service and maintenance, Accordingly, the apparatus and methods described above are applicable for aircraft manufacturing and service method 900 as shown in FIG. 7 and for aircraft 902 as shown in FIG. 8, During pre-production, method 900 includes specification and design 904 of aircraft 902 and material procurement 906. During production, component and subassembly manufacturing 908 and system integration 910 of aircraft 902 takes place. Thereafter, aircraft 902 goes through certification and delivery 912 in order to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For the purposes of this description, a system integrator may include without limitation any number of aircraft manufacturers and major-system subcontractors; a third party may include without limitation any number of venders, subcontractors, and suppliers; and an operator can be an airline, leasing company, military entity, service organization, and so on.

As shown in FIG. 8, aircraft 902 produced by method 900 includes airframe 918 with plurality of systems 920, and interior 922. Examples of systems 920 include one or more of propulsion system 924, electrical system 926, hydraulic system 928, and environmental system 930. Any number of other systems can be included. Although an aerospace example is shown, the principles of the examples described herein may be applied to other industries, such as the automotive industry.

Apparatus and methods presented herein can be employed during any one or more of the stages of method 900. For example, components or subassemblies corresponding to manufacturing 908 are fabricated or manufactured in a manner similar to components or subassemblies produced while aircraft 902 is in service. Also, one or more apparatus examples, method examples, or a combination thereof may be utilized during manufacturing 908 and system integration 910, .for example, by substantially expediting assembly of or reducing the cost of an aircraft 902. Similarly, one or more of apparatus examples, method examples, or a combination thereof may be utilized while aircraft 902 is in service, for example and without limitation, to maintenance and service 916.

Further Examples

Further, the description includes examples according to the following clauses:

Clause 1. method 200 comprising:

advancing optical magnetic marker 100 into a target position at layup tool 300, optical magnetic marker 100 comprising reflective surface 109 and anchor 103, anchor 103 protruding away from layup tool 300 and being opposite to reflective surface 109;

placing composite layup 320 over layup tool 300 while maintaining optical magnetic marker 100 at the target position such that anchor 103 of optical magnetic marker 100 protrudes into and directly engages composite layup 320;

curing composite layup 320 thereby bonding anchor 103 of optical magnetic marker 100 to composite layup 320; and after curing composite layup 320, separating composite layup 320 from layup tool 300 such that optical magnetic marker 100 is extracted from layup tool 300 while bonded to composite layup 320, wherein reflective surface 109 of optical magnetic marker 100 is radially surrounded by layup cavity 322, comprising bottom surface 325 and side surface 326, wherein an angle between bottom surface 325 and reflective surface 109 of optical magnetic marker 100 is greater than 0°.

Clause 2. Method 200 of clause 1, wherein advancing optical magnetic marker 100 into the target position and maintaining optical magnetic marker 100 at the target position are performed using magnetic forces between optical magnetic marker 100 and magnetic retention ring 160 of layup tool 300.

Clause 3. Method 200 of any one of clauses 1-2, wherein magnetic retention ring 160 protrudes above tool processing surface 303 of layup tool 300 and forms layup cavity 322 while placing and curing composite layup 320 over layup tool 300.

Cause 4. Method 200 of any one of clauses 1-3, wherein optical magnetic marker 100 comprises non-magnetic portion 102 and magnetic portion 104, offset relative to each other along marker center axis 101, wherein anchor 103 is a part of non-magnetic portion 102, wherein reflective surface 109 is a part of magnetic portion 104, and wherein magnetic portion 104 is surrounded by magnetic retention ring 160 while placing and curing composite layup 320 over layup tool 300.

Clause 5. Method 200 of clause 4, wherein non-magnetic portion 102 extends into and is bonded to composite layup 320.

Clause 6. Method 200 of clause 4, wherein magnetic portion 104 extends into layup cavity 322 after separating composite layup 320 from layup tool 300.

Clause 7. Method 200 of clause 4, wherein each of magnetic retention ring 160 and magnetic portion 104 of optical magnetic marker 100 is diametrically magnetized such that advancing optical magnetic marker 100 into the target position at layup tool 300 comprises turning optical magnetic marker 100 within magnetic retention ring 160.

Clause 8. Method 200 of clause 4, wherein curing the composite layup 320 comprises controlling the pressure within the space between magnetic retention ring 160 and magnetic portion 104 of optical magnetic marker 100 thereby preventing composite layup 320 from entering the space between magnetic retention ring 160 and magnetic portion 104.

Clause 9. Method 200 of clause 1, wherein anchor 103 of optical magnetic marker 100 is a radial recess such that placing and curing composite layup 320 over layup tool 300 comprises protruding a portion of composite layup 320 into the radial recess.

Clause 10. Method 200 of any one of clauses 1-9, wherein separating composite layup 320 from layup tool 300 comprises advancing additional optical magnetic marker 110 into the target position at layup tool 300 such that additional optical magnetic marker 110 is magnetically attracted to optical magnetic marker 100.

Clause 11. Method 200 of clause 10, wherein separating the composite layup 320 from layup tool 300 further comprises separating additional optical magnetic marker 110 from optical magnetic marker 100 when additional optical magnetic marker 110 reaches the target position.

Clause 12. Method 200 of clause 10, further comprising the repeating placing, curing, and separating operations with additional optical magnetic marker 110.

Clause 13. Method 200 of any one of clauses 1-12, further comprising determining a processing location at composite layup 320 by capturing the reflection from reflective surface 109 of optical magnetic marker 100 using optical detector 350.

Clause 14. Method 200 of clause 13, wherein the reflection from bottom surface 325 and side surface 326 is not directed at optical detector 350, while capturing the reflection from reflective surface 109 of optical magnetic marker 100, thereby creating optical contrast with reflective surface 109 of optical magnetic marker 100.

Clause 15. Method 200 of any one of clauses 13-14, further comprising processing composite layup 320 at the processing location such that optical magnetic marker 100 is consumed during processing.

Clause 16. Method 200 of clause 1, further comprising assembling layup tool 300 by attaching optical magnetic marker dispenser 150 to layup tool base 310, optical magnetic marker dispenser 150 comprising:

magazine 170, inserted into layup tool base 310, and magnetic retention ring 160, configured to advance optical magnetic marker 100 to the target position, maintain optical magnetic marker 100 at the target position, and to define layup cavity 322.

Clause 17. Method 200 of clause 16, further comprising loading optical magnetic marker dispenser 150 with plurality of optical magnetic markers 111, wherein optical magnetic marker 100 is a part of plurality of optical magnetic markers 111, wherein, during loading, optical magnetic marker 100 advances to the target position, and wherein, after loading, one or more remaining ones of plurality of optical magnetic markers 111 protrude into magazine 170.

Clause 18. Method 200 of clause 17, wherein, during loading, optical magnetic marker 100 is turned about 90° relative to magnetic retention ring 160 while being advanced into the target position.

Clause 19. Method 200 of any one of clauses 1-18, wherein a smallest angle between the side surface (326) and the reflective surface (109) of the optical magnetic marker (100) is less than 90°.

Clause 20. Method 200 of any one of clauses 1-19, wherein reflective surface 109 is recessed into the layup cavity 322.

Clause 21. Optical magnetic marker dispenser 150, comprising:

magnetic retention ring 160, comprising first end 161 and second end 162, opposite of first end 161 along dispenser center axis 152, wherein magnetic retention ring 160 is magnetized and further comprises:

leading surface 164, positioned at first end 161 and forming the smallest angle with dispenser center axis 152 of less than 90°, and side surface 163, extending between first end 161 and second end 162;

magazine 170, connected to magnetic retention ring 160; and marker supporting cavity 182, extending through magazine 170 and magnetic retention ring 160 and open at first end 161 of magnetic retention ring 160 and configured to store plurality of optical magnetic markers 111.

Clause 22. Optical magnetic marker dispenser 150 of clause 21, wherein magnetic retention ring 160 is diametrically magnetized.

Clause 23. Optical magnetic marker dispenser 150 of any one of clauses 21-22, wherein magazine 170 is magnetized.

Clause 24. Optical magnetic marker dispenser 150 of any one of clauses 21-23, wherein magazine 170 comprises magazine neck 186 and magazine collar 184, having a larger diameter than magazine neck 186 and attached to magnetic retention ring 160 such that magazine collar 184 is disposed between magnetic retention ring 160 and magazine neck 186.

Clause 25. Optical magnetic marker dispenser 150 of clause 24, wherein magazine 170 comprises removal port 188, extending through magazine collar 184 and forming a portion of neck-facing surface 185 of magazine collar 184.

Clause 26. Optical magnetic marker dispenser 150 of any one of clauses 24-25, wherein magazine collar 184 comprises magazine processing surface 183, interfacing with second end 162 of magnetic retention ring 160 such that side surface 163 of magnetic retention ring 160 extends to and non-perpendicular to magazine processing surface 183.

Clause 27. Optical magnetic marker dispenser 150 of any one of clauses 24-26 wherein magazine collar 184 is configured to press-fit or thread into layup tool base 310.

Clause 28. Optical magnetic marker dispenser 150 of clause 24, wherein magazine neck 186 is curved or flexible.

Clause 29. Optical magnetic marker dispenser 150 of any one of clauses 21-28, further comprising pressure controller 156, fluidically coupled to marker supporting cavity 182.

Clause 30. Optical magnetic marker dispenser 150 of any one of clauses 21-29, wherein leading surface 154 is tilted toward magazine 170 as leading surface 154 extends toward dispenser center axis 152.

Clause 31. Optical magnetic marker dispenser 150 of any one of clauses 21-30, further comprising optical magnetic marker 100, comprising:

non-magnetic portion 102, comprising anchor 103; and magnetic portion 104, offset relative to non-magnetic portion 102 along marker center axis 101 of optical magnetic marker 100, magnetic portion 104 comprising reflective surface 109.

Clause 32. Optical magnetic marker dispenser 150 of clause 31, wherein magnetic portion 104 of optical magnetic marker 100 is diametrically magnetized.

Clause 33. Optical magnetic marker dispenser 150 of any one of clauses 31-32, wherein the anchor 103 of the optical magnetic marker 100 is a radial recess.

Clause 34. Optical magnetic marker dispenser 150 of any one of clauses 31-33, wherein anchor 103 of optical magnetic marker 100 is a bulb-shaped cavity.

Clause 35. Optical magnetic marker dispenser 150 of any one of clauses 31-34, wherein the height of non-magnetic portion 102 of optical magnetic marker 100 along marker center axis 101 is less than that of magnetic portion 104.

Clause 36. Optical magnetic marker dispenser 150 of any one of clauses 31-35, wherein the optical magnetic marker 100 has a cylindrical shape.

Clause 37. Optical magnetic marker dispenser 150 of any one of clauses 31-36, wherein the diameter of optical magnetic marker 100 is between about 0.2 millimeters and 1 millimeter.

Clause 38. Optical magnetic marker dispenser 150 of any one of clauses 31-37, wherein side surface 163 forms an angle with dispenser center axis 152 of greater than 0°.

Clause 39. Optical magnetic marker dispenser 150 of any one of clauses 31-38, wherein magnetic portion 104 of optical magnetic marker 100 comprises a nickel coating or a silver coating forming reflective surface 109.

Clause 40. Optical magnetic marker dispenser 150 of any one of clauses 31-39, wherein reflective surface 109 is perpendicular to marker center axis 101.

Clause 41. Layup tool 300, comprising:

layup tool base 310, comprising base processing surface 313 and base cavity 312; and optical magnetic marker dispenser 150, having dispenser center axis 152 and comprising:

magazine 170, protruding into base cavity 312 and supported within base cavity 312 by layup tool base 310;

magnetic retention ring 160, being magnetized and connected to magazine 170, magnetic retention ring 160 comprising:

leading surface 164, forming the smallest angle with dispenser center axis 152 of less than 90', and side surface 163; and marker supporting cavity 182, extending through magazine 170 and magnetic retention ring 160 and open at leading surface 164 of magnetic retention ring 160.

Clause 42. Layup tool 300 of clause 41, wherein magazine 110 is press-fit or threaded into base cavity 312.

Clause 43. Layup tool 300 of any one of clauses 41-42, wherein magazine 170 comprises magazine neck 186 and magazine collar 184, having a larger diameter than magazine neck 186 and press-fit or threaded into base cavity 312.

Clause 44. Layup tool 300 of clause 43, wherein magazine 170 comprises removal port 188 extending through magazine collar 184 and in fluid communication with layup tool base 310.

Clause 45. Layup tool 00 of any one of clauses 41-44, wherein magazine 170 extends through layup tool base 310.

Clause 46. Layup tool 300 of any one of clauses 41-45, wherein magazine 170 comprises magazine processing surface 183, coplanar with base processing surface 313, and wherein side surface 163 extends between magazine processing surface 183 and leading surface 164.

Clause 47. Layup tool 300 of any one of clauses 41-46, further comprising plurality of optical magnetic markers 111, positioned within marker supporting cavity 182, wherein optical magnetic marker 100 of plurality of optical magnetic markers 111 is maintained at the target position at layup tool 300 using magnetic retention ring 160.

Clause 48. Layup tool 300 of clause 48, wherein one or more remaining ones of plurality of optical magnetic markers 111 extend into magazine 170.

Clause 49. Layup tool 300 of any one of clauses 41-48 wherein magnetic retention ring 160 is diametrically magnetized.

Clause 50. Layup tool 300 of any one of clauses 41-49, wherein magazine 170 is magnetized.

Clause 51. Layup tool 300 of any one of clauses claim 41-50, wherein side surface 163 forms an angle of greater than 0° with dispenser center axis 152.

CONCLUSION

Although the foregoing concepts have been described in some detail for purposes of clarity of understanding, it will be apparent that certain changes and modifications may be practiced within the scope of the appended claims. It should be noted that there are many alternative ways of implementing the processes, systems, and apparatus. Accordingly, the present examples are to be considered as illustrative and not restrictive.

What is claimed is:

1. An optical magnetic marker dispenser, comprising:
  a magnetic retention ring, comprising a first end and a second end, opposite of the first end along a dispenser center axis,
    wherein the magnetic retention ring is magnetized and further comprises:
      a leading surface, positioned at the first end and forming a smallest
    angle with the dispenser center axis of less than 90°, and
      a side surface, extending between the first end and the second end;
  a magazine, connected to the magnetic retention ring; and
  a marker supporting cavity, extending through the magazine and the magnetic retention ring and open at the first end of the magnetic retention ring and configured to store a plurality of optical magnetic markers.

2. The optical magnetic marker dispenser of claim 1, wherein the magnetic retention ring is diametrically magnetized.

3. The optical magnetic marker dispenser of claim 1, wherein the magazine is magnetized.

4. The optical magnetic marker dispenser of claim 1, wherein the magazine comprises a magazine neck and a magazine collar, having a larger diameter than the magazine neck and attached to the magnetic retention ring such that the magazine collar is disposed between the magnetic retention ring and the magazine neck.

5. The optical magnetic marker dispenser of claim 4, wherein the magazine comprises a removal port, extending through the magazine collar and forming a portion of a neck-facing surface of the magazine collar.

6. The optical magnetic marker dispenser of claim 4, wherein the magazine collar comprises a magazine processing surface, interfacing with the second end of the magnetic retention ring such that the side surface of the magnetic retention ring extends to and non-perpendicular to the magazine processing surface.

7. The optical magnetic marker dispenser of claim 4, wherein the magazine neck is curved or flexible.

8. The optical magnetic marker dispenser of claim 1, wherein the leading surface is tilted toward the magazine as the leading surface extends toward the dispenser center axis.

9. The optical magnetic marker dispenser of claim 1, further comprising an optical magnetic marker, comprising:
  a non-magnetic portion, comprising an anchor; and
  a magnetic portion, offset relative to the non-magnetic portion along a marker center axis of the optical magnetic marker, the magnetic portion comprising a reflective surface.

10. The optical magnetic marker dispenser of claim 9, wherein the magnetic portion of the optical magnetic marker is diametrically magnetized.

11. The optical magnetic marker dispenser of claim 9, wherein the anchor of the optical magnetic marker is a radial recess or a bulb-shaped cavity.

12. The optical magnetic marker dispenser of claim 9, wherein a height of the non-magnetic portion of the optical magnetic marker along the marker center axis is less than that of the magnetic portion.

13. The optical magnetic marker dispenser of claim 9, wherein the side surface forms an angle with the dispenser center axis of greater than 0°.

14. The optical magnetic marker dispenser of claim 9, wherein the magnetic portion of the optical magnetic marker comprises a nickel coating or a silver coating forming the reflective surface.

15. The optical magnetic marker dispenser of claim9, wherein the reflective surface is perpendicular to the marker center axis.

16. A layup tool, comprising:
  a layup tool base, comprising a base processing surface and a base cavity; and
  an optical magnetic marker dispenser, having a dispenser center axis and comprising:
    a magazine, protruding into the base cavity and supported within the base cavity by the layup tool base;
    a magnetic retention ring, being magnetized and connected to the magazine, the magnetic retention ring comprising:
      a leading surface, forming a smallest angle with the dispenser center axis of less than 9°, and
      a side surface; and a marker supporting cavity, extending through the magazine and the magnetic retention ring and open at the leading surface of the magnetic retention ring.

17. The layup tool of claim 16, wherein the magazine is press-fit or threaded into the base cavity.

18. The layup tool of claim 16, wherein the magazine comprises a magazine neck and a magazine collar, having a larger diameter than the magazine neck and press-fit or threaded into the base cavity.

19. The layup tool of claim 16, wherein the magazine extends through the layup tool base.

20. The layup tool of claim 16, wherein the magazine comprises a magazine processing surface, coplanar with the base processing surface, and wherein the side surface extends between the magazine processing surface and the leading surface.

* * * * *